US009372546B2

(12) United States Patent
Yin et al.

(10) Patent No.: US 9,372,546 B2
(45) Date of Patent: Jun. 21, 2016

(54) HAND POINTING ESTIMATION FOR HUMAN COMPUTER INTERACTION

(71) Applicant: The Research Foundation for The State University of New York, Binghamton, NY (US)

(72) Inventors: Lijun Yin, Vestal, NY (US); Shaun Canavan, Vestal, NY (US); Kaoning Hu, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 14/844,815

(22) Filed: Sep. 3, 2015

(65) Prior Publication Data

US 2015/0378444 A1    Dec. 31, 2015

Related U.S. Application Data

(63) Continuation of application No. 14/635,094, filed on Mar. 2, 2015, now Pat. No. 9,128,530, which is a continuation of application No. 13/571,645, filed on Aug. 10, 2012, now Pat. No. 8,971,572.

(60) Provisional application No. 61/523,152, filed on Aug. 12, 2011.

(51) Int. Cl.
*G06K 9/00* (2006.01)
*G06F 3/01* (2006.01)
(Continued)

(52) U.S. Cl.
CPC .............. *G06F 3/017* (2013.01); *G06F 3/0304* (2013.01); *G06K 9/00335* (2013.01);
(Continued)

(58) Field of Classification Search
USPC ......... 382/100, 103, 106–107, 162, 168, 173, 382/181, 199, 209, 219, 232, 254, 274, 382/285–297, 305, 312; 715/773, 784; 345/173, 677, 163
See application file for complete search history.

(56) References Cited

U.S. PATENT DOCUMENTS 4,550,250 A    10/1985  Mueller et al.
4,774,862 A    10/1988  Scull
(Continued)

FOREIGN PATENT DOCUMENTS

WO    WO03071410    8/2003
WO    WO2007043036  4/2007
(Continued)

OTHER PUBLICATIONS

L Clinque, et al, Fast viewpoint-invariant articulated hand detection combining curve and graph matching, IEEE FGR 2008.
(Continued)

*Primary Examiner* — Seyed Azarian
(74) *Attorney, Agent, or Firm* — Steven M. Hoffberg, Esq.; Ostrolenk Faber LLP

(57) ABSTRACT

Hand pointing has been an intuitive gesture for human interaction with computers. A hand pointing estimation system is provided, based on two regular cameras, which includes hand region detection, hand finger estimation, two views' feature detection, and 3D pointing direction estimation. The technique may employ a polar coordinate system to represent the hand region, and tests show a good result in terms of the robustness to hand orientation variation. To estimate the pointing direction, Active Appearance Models are employed to detect and track, e.g., 14 feature points along the hand contour from a top view and a side view. Combining two views of the hand features, the 3D pointing direction is estimated.

20 Claims, 8 Drawing Sheets

(51) Int. Cl.

| | | |
|---|---|---|
| *G06K 9/62* | (2006.01) | |
| *G06F 3/03* | (2006.01) | |
| *G06K 9/52* | (2006.01) | |
| *G06T 7/00* | (2006.01) | |
| *G06F 3/041* | (2006.01) | |
| *G06K 9/46* | (2006.01) | |

(52) U.S. Cl.
CPC ....... *G06K 9/00355* (2013.01); *G06K 9/00375* (2013.01); *G06K 9/00624* (2013.01); *G06K 9/4652* (2013.01); *G06K 9/52* (2013.01); *G06K 9/621* (2013.01); *G06T 7/0042* (2013.01); *G06T 7/0097* (2013.01); *G06K 9/4614* (2013.01); *G06K 2009/4666* (2013.01); *G06T 2207/20144* (2013.01)

(56) References Cited

U.S. PATENT DOCUMENTS

| | | |
|---|---|---|
| 4,988,981 A | 1/1991 | Zimmerman et al. |
| 5,549,469 A | 8/1996 | Wild et al. |
| 6,101,269 A | 8/2000 | Hunter et al. |
| 6,323,846 B1 | 11/2001 | Westerman et al. |
| 6,323,942 B1 | 11/2001 | Bamji |
| 6,452,584 B1 | 9/2002 | Walker et al. |
| 6,522,395 B1 | 2/2003 | Bamji et al. |
| 6,614,422 B1 | 9/2003 | Rafii et al. |
| 6,674,895 B2 | 1/2004 | Rafii et al. |
| 6,678,039 B2 | 1/2004 | Charbon |
| 6,710,770 B2 | 3/2004 | Tomasi et al. |
| 6,888,536 B2 | 5/2005 | Westerman et al. |
| 6,906,793 B2 | 6/2005 | Bamji et al. |
| 7,030,861 B1 | 4/2006 | Westerman et al. |
| 7,151,530 B2 | 12/2006 | Roeber et al. |
| 7,176,438 B2 | 2/2007 | Bamji et al. |
| 7,212,663 B2 | 5/2007 | Tomasi |
| 7,321,111 B2 | 1/2008 | Bamji et al. |
| RE40,153 E | 3/2008 | Westerman et al. |
| 7,339,580 B2 | 3/2008 | Westerman et al. |
| 7,340,077 B2 | 3/2008 | Gokturk et al. |
| 7,348,963 B2 | 3/2008 | Bell |
| 7,352,454 B2 | 4/2008 | Bamji et al. |
| 7,469,381 B2 | 12/2008 | Ording |
| 7,479,949 B2 | 1/2009 | Jobs et al. |
| 7,480,870 B2 | 1/2009 | Anzures et al. |
| 7,507,947 B2 | 3/2009 | Bamji et al. |
| 7,509,588 B2 | 3/2009 | Van Os et al. |
| 7,511,702 B2 | 3/2009 | Hotelling |
| 7,538,760 B2 | 5/2009 | Hotelling et al. |
| 7,574,672 B2 | 8/2009 | Jobs et al. |
| 7,593,000 B1 | 9/2009 | Chin |
| 7,599,520 B2 | 10/2009 | Dempski et al. |
| RE40,993 E | 11/2009 | Westerman |
| 7,614,008 B2 | 11/2009 | Ording |
| 7,619,618 B2 | 11/2009 | Westerman et al. |
| 7,633,076 B2 | 12/2009 | Huppi et al. |
| 7,653,883 B2 | 1/2010 | Hotelling et al. |
| 7,656,393 B2 | 2/2010 | King et al. |
| 7,656,394 B2 | 2/2010 | Westerman et al. |
| 7,657,849 B2 | 2/2010 | Chaudhri et al. |
| 7,663,607 B2 | 2/2010 | Hotelling et al. |
| 7,667,148 B2 | 2/2010 | Mansfield et al. |
| 7,671,756 B2 | 3/2010 | Herz et al. |
| 7,688,315 B1 | 3/2010 | Gettemy et al. |
| 7,692,629 B2 | 4/2010 | Baudisch et al. |
| 7,694,231 B2 | 4/2010 | Kocienda et al. |
| 7,702,660 B2 | 4/2010 | Chan et al. |
| 7,705,830 B2 | 4/2010 | Westerman et al. |
| 7,710,391 B2 | 5/2010 | Bell et al. |
| 7,711,681 B2 | 5/2010 | Dempski et al. |
| 7,714,265 B2 | 5/2010 | Fadell et al. |
| 7,719,523 B2 | 5/2010 | Hillis |
| 7,728,316 B2 | 6/2010 | Fadell et al. |
| 7,728,821 B2 | 6/2010 | Hillis et al. |
| 7,754,955 B2 | 7/2010 | Egan |
| 7,760,767 B2 | 7/2010 | Nilo et al. |
| 7,764,274 B2 | 7/2010 | Westerman et al. |
| 7,777,732 B2 | 8/2010 | Herz et al. |
| 7,782,307 B2 | 8/2010 | Westerman et al. |
| 7,786,975 B2 | 8/2010 | Ording et al. |
| 7,793,225 B2 | 9/2010 | Anzures et al. |
| 7,793,228 B2 | 9/2010 | Mansfield et al. |
| 7,800,592 B2 | 9/2010 | Kerr et al. |
| 7,809,167 B2 | 10/2010 | Bell |
| 7,812,826 B2 | 10/2010 | Ording et al. |
| 7,812,828 B2 | 10/2010 | Westerman et al. |
| 7,821,541 B2 | 10/2010 | Delean |
| 7,826,641 B2 | 11/2010 | Mandella et al. |
| 7,834,846 B1 | 11/2010 | Bell |
| 7,835,999 B2 | 11/2010 | Block |
| 7,840,912 B2 | 11/2010 | Elias et al. |
| 7,843,427 B2 | 11/2010 | Ording et al. |
| 7,844,914 B2 | 11/2010 | Andre et al. |
| 7,844,915 B2 | 11/2010 | Platzer et al. |
| 7,856,605 B2 | 12/2010 | Ording et al. |
| 7,859,521 B2 | 12/2010 | Hotelling et al. |
| RE42,064 E | 1/2011 | Fish |
| 7,864,163 B2 | 1/2011 | Ording et al. |
| 7,870,496 B1 | 1/2011 | Sherwani |
| 7,872,652 B2 | 1/2011 | Platzer et al. |
| 7,876,288 B1 | 1/2011 | Huang |
| 7,876,311 B2 | 1/2011 | Krah et al. |
| 7,877,707 B2 | 1/2011 | Westerman et al. |
| 7,884,804 B2 | 2/2011 | Kong |
| 7,889,175 B2 | 2/2011 | Kryze et al. |
| 7,889,184 B2 | 2/2011 | Blumenberg et al. |
| 7,889,185 B2 | 2/2011 | Blumenberg et al. |
| 7,890,778 B2 | 2/2011 | Jobs et al. |
| 7,902,840 B2 | 3/2011 | Zachut et al. |
| 7,903,115 B2 | 3/2011 | Platzer et al. |
| 7,907,020 B2 | 3/2011 | Wilson |
| 7,907,117 B2 | 3/2011 | Wilson et al. |
| 7,907,125 B2 | 3/2011 | Weiss et al. |
| 7,910,843 B2 | 3/2011 | Rothkopf et al. |
| 7,916,126 B2 | 3/2011 | Westerman et al. |
| 7,918,019 B2 | 4/2011 | Chang et al. |
| 7,920,134 B2 | 4/2011 | Krah |
| 7,921,187 B2 | 4/2011 | Lunati et al. |
| 7,924,271 B2 | 4/2011 | Christie et al. |
| 7,924,272 B2 | 4/2011 | Boer et al. |
| 7,930,642 B1 | 4/2011 | Gerde et al. |
| 7,932,896 B2 | 4/2011 | Westerman |
| 7,932,897 B2 | 4/2011 | Elias et al. |
| 7,934,156 B2 | 4/2011 | Forstall et al. |
| 7,936,341 B2 | 5/2011 | Weiss |
| 7,940,250 B2 | 5/2011 | Forstall |
| 7,941,760 B2 | 5/2011 | Kocienda et al. |
| 7,956,846 B2 | 6/2011 | Ording et al. |
| 7,956,847 B2 | 6/2011 | Christie |
| 7,956,849 B2 | 6/2011 | Anzures et al. |
| 7,957,762 B2 | 6/2011 | Herz et al. |
| 7,958,456 B2 | 6/2011 | Ording et al. |
| 7,961,909 B2 | 6/2011 | Mandella et al. |
| 7,966,578 B2 | 6/2011 | Tolmasky et al. |
| 7,975,242 B2 | 7/2011 | Forstall et al. |
| 8,400,494 B2 | 3/2013 | Zalevsky et al. |
| 8,971,572 B1 | 3/2015 | Yin et al. |
| 9,066,084 B2 | 6/2015 | Zalevsky et al. |
| 2003/0174125 A1 | 9/2003 | Torunoglu et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0125803 A1 | 6/2006 | Westerman et al. |
| 2006/0197750 A1 | 9/2006 | Kerr et al. |
| 2006/0197752 A1 | 9/2006 | Hurst et al. |
| 2008/0052945 A1 | 3/2008 | Matas et al. |
| 2008/0055263 A1 | 3/2008 | Lemay et al. |
| 2008/0055264 A1 | 3/2008 | Anzures et al. |
| 2008/0055269 A1 | 3/2008 | Lemay et al. |
| 2008/0055272 A1 | 3/2008 | Anzures et al. |
| 2008/0055273 A1 | 3/2008 | Forstall |
| 2008/0057926 A1 | 3/2008 | Forstall et al. |
| 2008/0074400 A1 | 3/2008 | Gettemy et al. |

(56) References Cited

U.S. PATENT DOCUMENTS

| | | |
|---|---|---|
| 2008/0082930 A1 | 4/2008 | Omernick et al. |
| 2008/0082934 A1 | 4/2008 | Kocienda et al. |
| 2008/0094356 A1 | 4/2008 | Ording et al. |
| 2008/0094368 A1 | 4/2008 | Ording et al. |
| 2008/0094369 A1 | 4/2008 | Ganatra et al. |
| 2008/0094370 A1 | 4/2008 | Ording et al. |
| 2008/0094371 A1 | 4/2008 | Forstall et al. |
| 2008/0098331 A1 | 4/2008 | Novick et al. |
| 2008/0122796 A1 | 5/2008 | Jobs et al. |
| 2008/0165022 A1 | 7/2008 | Herz et al. |
| 2008/0165136 A1 | 7/2008 | Christie et al. |
| 2008/0165142 A1 | 7/2008 | Kocienda et al. |
| 2008/0165143 A1 | 7/2008 | Tolmasky et al. |
| 2008/0165144 A1 | 7/2008 | Forstall et al. |
| 2008/0165145 A1 | 7/2008 | Herz et al. |
| 2008/0165146 A1 | 7/2008 | Matas |
| 2008/0165147 A1 | 7/2008 | Christie et al. |
| 2008/0165148 A1 | 7/2008 | Williamson et al. |
| 2008/0165149 A1 | 7/2008 | Platzer et al. |
| 2008/0165151 A1 | 7/2008 | Lemay et al. |
| 2008/0165152 A1 | 7/2008 | Forstall et al. |
| 2008/0165153 A1 | 7/2008 | Platzer et al. |
| 2008/0165160 A1 | 7/2008 | Kocienda et al. |
| 2008/0167834 A1 | 7/2008 | Herz et al. |
| 2008/0168349 A1 | 7/2008 | Lamiraux et al. |
| 2008/0168353 A1 | 7/2008 | Anzures et al. |
| 2008/0168361 A1 | 7/2008 | Forstall et al. |
| 2008/0168365 A1 | 7/2008 | Chaudhri |
| 2008/0168379 A1 | 7/2008 | Forstall et al. |
| 2008/0168395 A1 | 7/2008 | Ording et al. |
| 2008/0168396 A1 | 7/2008 | Matas et al. |
| 2008/0168404 A1 | 7/2008 | Ording |
| 2008/0168405 A1 | 7/2008 | Tolmasky et al. |
| 2008/0174570 A1 | 7/2008 | Jobs et al. |
| 2008/0180408 A1 | 7/2008 | Forstall et al. |
| 2008/0201650 A1 | 8/2008 | Lemay et al. |
| 2008/0204426 A1 | 8/2008 | Hotelling et al. |
| 2008/0211766 A1 | 9/2008 | Westerman et al. |
| 2008/0211775 A1 | 9/2008 | Hotelling et al. |
| 2008/0211778 A1 | 9/2008 | Ording et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0218535 A1 | 9/2008 | Forstall et al. |
| 2008/0220752 A1 | 9/2008 | Forstall et al. |
| 2008/0222545 A1 | 9/2008 | Lemay et al. |
| 2008/0231610 A1 | 9/2008 | Hotelling et al. |
| 2008/0256494 A1 | 10/2008 | Greenfield |
| 2008/0320391 A1 | 12/2008 | Lemay et al. |
| 2008/0320419 A1 | 12/2008 | Matas et al. |
| 2009/0005011 A1 | 1/2009 | Christie et al. |
| 2009/0006570 A1 | 1/2009 | Forstall et al. |
| 2009/0006644 A1 | 1/2009 | Forstall et al. |
| 2009/0007017 A1 | 1/2009 | Anzures et al. |
| 2009/0016642 A1 | 1/2009 | Hart |
| 2009/0044988 A1 | 2/2009 | Chang et al. |
| 2009/0058830 A1 | 3/2009 | Herz et al. |
| 2009/0066728 A1 | 3/2009 | Ording |
| 2009/0070704 A1 | 3/2009 | Ording |
| 2009/0070705 A1 | 3/2009 | Ording |
| 2009/0073194 A1 | 3/2009 | Ording |
| 2009/0077488 A1 | 3/2009 | Ording |
| 2009/0100129 A1 | 4/2009 | Vigil et al. |
| 2009/0167700 A1 | 7/2009 | Westerman et al. |
| 2009/0174679 A1 * | 7/2009 | Westerman ......... G06F 3/03547 345/173 |
| 2009/0174680 A1 | 7/2009 | Anzures et al. |
| 2009/0177981 A1 | 7/2009 | Christie et al. |
| 2009/0178007 A1 | 7/2009 | Matas et al. |
| 2009/0178008 A1 | 7/2009 | Herz et al. |
| 2009/0185274 A1 | 7/2009 | Shpunt |
| 2009/0219256 A1 | 9/2009 | Newton |
| 2009/0228792 A1 | 9/2009 | van Os et al. |
| 2009/0228807 A1 | 9/2009 | Lemay |
| 2009/0228825 A1 | 9/2009 | Van Os et al. |
| 2009/0256817 A1 | 10/2009 | Perlin et al. |
| 2009/0273571 A1 | 11/2009 | Bowens |
| 2009/0278816 A1 | 11/2009 | Colson |
| 2009/0289911 A1 | 11/2009 | Nagai |
| 2009/0303231 A1 | 12/2009 | Robinet et al. |
| 2009/0307633 A1 | 12/2009 | Haughay, Jr. et al. |
| 2009/0322688 A1 | 12/2009 | Ording et al. |
| 2009/0327976 A1 | 12/2009 | Williamson et al. |
| 2010/0037273 A1 | 2/2010 | Dressel et al. |
| 2010/0045628 A1 | 2/2010 | Gettemy et al. |
| 2010/0045629 A1 | 2/2010 | Newton |
| 2010/0045633 A1 | 2/2010 | Gettemy et al. |
| 2010/0045705 A1 | 2/2010 | Vertegaal et al. |
| 2010/0060586 A1 | 3/2010 | Pisula et al. |
| 2010/0079405 A1 | 4/2010 | Bernstein |
| 2010/0088595 A1 | 4/2010 | Ho et al. |
| 2010/0090971 A1 | 4/2010 | Choi et al. |
| 2010/0095234 A1 | 4/2010 | Lane et al. |
| 2010/0097328 A1 | 4/2010 | Simmons et al. |
| 2010/0097329 A1 | 4/2010 | Simmons et al. |
| 2010/0097342 A1 | 4/2010 | Simmons et al. |
| 2010/0110932 A1 | 5/2010 | Doran et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0130280 A1 | 5/2010 | Arezina et al. |
| 2010/0171712 A1 | 7/2010 | Cieplinski et al. |
| 2010/0229090 A1 | 9/2010 | Newton et al. |
| 2010/0231506 A1 | 9/2010 | Pryor |
| 2010/0231533 A1 | 9/2010 | Chaudhri |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0231612 A1 | 9/2010 | Chaudhri et al. |
| 2010/0235118 A1 | 9/2010 | Moore et al. |
| 2010/0235726 A1 | 9/2010 | Ording et al. |
| 2010/0235729 A1 | 9/2010 | Kocienda et al. |
| 2010/0235734 A1 | 9/2010 | Ording et al. |
| 2010/0235735 A1 | 9/2010 | Ording et al. |
| 2010/0235746 A1 | 9/2010 | Anzures |
| 2010/0235770 A1 | 9/2010 | Ording et al. |
| 2010/0235778 A1 | 9/2010 | Kocienda et al. |
| 2010/0235783 A1 | 9/2010 | Ording et al. |
| 2010/0235784 A1 | 9/2010 | Ording et al. |
| 2010/0235785 A1 | 9/2010 | Ording et al. |
| 2010/0235793 A1 | 9/2010 | Ording et al. |
| 2010/0235794 A1 | 9/2010 | Ording |
| 2010/0265316 A1 | 10/2010 | Sali et al. |
| 2010/0273139 A1 | 10/2010 | Doppelt et al. |
| 2010/0283747 A1 | 11/2010 | Kukulski |
| 2010/0284082 A1 | 11/2010 | Shpunt et al. |
| 2010/0289754 A1 | 11/2010 | Sleeman et al. |
| 2010/0293462 A1 | 11/2010 | Bull et al. |
| 2010/0309147 A1 | 12/2010 | Fleizach et al. |
| 2010/0309148 A1 | 12/2010 | Fleizach et al. |
| 2010/0309149 A1 | 12/2010 | Blumenberg et al. |
| 2010/0309154 A1 | 12/2010 | Lin et al. |
| 2010/0309155 A1 | 12/2010 | Lu et al. |
| 2010/0313125 A1 | 12/2010 | Fleizach et al. |
| 2010/0313157 A1 | 12/2010 | Carlsson et al. |
| 2011/0001706 A1 | 1/2011 | Sanford et al. |
| 2011/0010626 A1 | 1/2011 | Fino et al. |
| 2011/0010672 A1 | 1/2011 | Hope |
| 2011/0025827 A1 | 2/2011 | Shpunt et al. |
| 2011/0052006 A1 | 3/2011 | Gurman et al. |
| 2011/0055317 A1 | 3/2011 | Vonog et al. |
| 2011/0063224 A1 | 3/2011 | Vexo et al. |
| 2011/0069016 A1 | 3/2011 | Victor |
| 2011/0069017 A1 | 3/2011 | Victor |
| 2011/0072375 A1 | 3/2011 | Victor |
| 2011/0072394 A1 | 3/2011 | Victor |
| 2011/0074677 A1 | 3/2011 | Ording et al. |
| 2011/0074694 A1 | 3/2011 | Rapp et al. |
| 2011/0074695 A1 | 3/2011 | Rapp et al. |
| 2011/0074696 A1 | 3/2011 | Rapp et al. |
| 2011/0074697 A1 * | 3/2011 | Rapp ..................... G06F 3/0481 345/173 |
| 2011/0074698 A1 | 3/2011 | Rapp et al. |

(56) References Cited

U.S. PATENT DOCUMENTS

| | | |
|---|---|---|
| 2011/0074699 A1 | 3/2011 | Marr et al. |
| 2011/0074710 A1 | 3/2011 | Weeldreyer et al. |
| 2011/0074828 A1 | 3/2011 | Capela et al. |
| 2011/0074830 A1* | 3/2011 | Rapp ............... G06F 3/04883 345/677 |
| 2011/0078560 A1 | 3/2011 | Weeldreyer et al. |
| 2011/0078597 A1 | 3/2011 | Rapp et al. |
| 2011/0078622 A1* | 3/2011 | Missig ............... G06F 3/0486 715/784 |
| 2011/0078624 A1 | 3/2011 | Missig et al. |
| 2011/0080344 A1* | 4/2011 | Dura ............... G06F 3/0416 345/163 |
| 2011/0080360 A1 | 4/2011 | Miller et al. |
| 2011/0080361 A1 | 4/2011 | Miller et al. |
| 2011/0102464 A1 | 5/2011 | Godavari |
| 2011/0141031 A1 | 6/2011 | McCullough et al. |
| 2011/0141142 A1 | 6/2011 | Leffert et al. |
| 2011/0145739 A1 | 6/2011 | Berger et al. |
| 2011/0145759 A1 | 6/2011 | Leffert et al. |
| 2011/0145768 A1 | 6/2011 | Leffert et al. |
| 2011/0145863 A1 | 6/2011 | Alsina et al. |
| 2011/0157029 A1 | 6/2011 | Tseng |
| 2011/0158508 A1 | 6/2011 | Shpunt et al. |
| 2011/0163955 A1 | 7/2011 | Nasiri et al. |
| 2011/0211044 A1 | 9/2011 | Shpunt et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2012/0038986 A1 | 2/2012 | Pesach |
| 2012/0070070 A1 | 3/2012 | Litvak |
| 2012/0078614 A1 | 3/2012 | Galor et al. |
| 2012/0124516 A1 | 5/2012 | Friedman |
| 2012/0169583 A1 | 7/2012 | Rippel et al. |
| 2012/0173732 A1 | 7/2012 | Sullivan |
| 2014/0189569 A1* | 7/2014 | Eleftheriou ........... G06F 3/0233 715/773 |

FOREIGN PATENT DOCUMENTS

| | | |
|---|---|---|
| WO | WO2007105205 | 9/2007 |
| WO | WO2007132451 | 11/2007 |
| WO | WO2008120217 | 10/2008 |
| WO | WO2010004542 | 1/2010 |

OTHER PUBLICATIONS

C. Colombo et al., Visual capture and understanding of hand pointing actions in a 3-D environment, IEEE Trans. on SMC-B 33(4), 2003. pp. 677-686.

T. Cootes, G. Edwards, and C. Taylor. Active appearance models. IEEE PAMI, 23(6): 681-685, 2001.

N. Jojic et al, Detection and estimation of pointing gestures in real-time stereo sequences, in IEEE FGR'00.

M. Kolsch and M. Turk. Analysis of rotational robustness of hand detection with a viola-jones detector. ICPR 2004.

I. Fratric and S. Ribaric, Real-time model based hand localization for unsupervised palmar image acquisition, Proc. ICB 2009.

M. Lee, D. Weinshall, et al. A computer vision system for on-screen item selection, IEEE CVPR 2001.

C. Manders, F. Farbiz, et al. Robust hand tracking using a skin tone and depth joint probability model. FGR, 2008.

T. Moeslund and E. Granum, A survey of computer vision-based human motion capture, CVIU 81(3), 2001.

T. Nguyen, N. Binh, and H. Bischof. An active boosting-based learning framework for real-time hand detection. IEEE FGR, 2008.

K. Oka, Y. Sato, and H. Koike, Real-time fingertip tracking and gesture recognition, IEEE Computer Graphics and Applications, 2002.

C. Park, M. Roh, and S. Lee, real-time 3D pointing gesture recognition in mobile space, IEEE FGR 2008.

V. Pavlovic and T. Huang, et al, Visual interpretation of hand gestures for HCI: review, IEEE Trans. PAMI, 1997.

A. Utsumiy, et al, Hand detection and tmcking using pixel value distribution model for multiple-camera-based gesture interactions. IEEE CVPR, 2001.

P. Viola and M. Jones. Robust real-time face detection, International J. Of Computer Vision 57(2)137-154, 2004.

R. Wang and J. Popovic, Real-time hand-tracking with a color glove, SIGGRAPH 2009.

Y. Wu and T. Huang, Vision-based gesture recognition: A review, in IEEE 3rd Gesture Workshop, 1999.

Y. Yamamoto et al, Arm-pointing gesture interface using surrounded stereo cameras system, in ICPR 2004.

B. Stenger, A Thayananthan, P. Ton, and R. Cipolla, Model-based hand tracking using a hierarchical Bayesian filter, IEEE Trans. PAMI, 28(9): 1372-1384, 2006.

T.R. Kaminski et al., "The coordination Between Trunk and Arm Motion During Pointing Movements", Exp Brain Res (1995) 106:457-466.

P. Ruli, et al., "Hand pointing detection system for tabletop visual human-machine interaction", vicos.fri.uni-lj.si/data/publications/rulicERK08.pdf (2008).

Y. Wu, et al., "View-independent Recognition of Hand Postures", In Proc. of IEEE Conf. on CVPR'2000, vol. II, pp. 88-94, Hilton Head Island, SC (2000).

J. F. Soechting et al., "Invariant Characteristics of a Pointing Movement in Man", J. Neuroscience 1(7):710-720 (1981).

J. Richarz, et al., "There You Go!—Estimating Pointing Gestures in Monocular Images for Mobile Robot Instruction", The 15th IEEE International Symposium on Robot and Human Interactive Communication (RO-MAN06), Hatfield, UK, Sep. 6-8, 2006.

Teofilo E. de Campos et al., "Directing the Attention of aWearable Camera by Pointing Gestures", IEEE Brazilian Symposium on Computer Graphics and Image Processing (SIBGRAPI) (2006).

Bjorn Dietmar Rafael Stenger, "Model-Based Hand Tracking Using a Hierarchical Bayesian Filter", Ph.D. Thesis, University of Cambridge 2004).

Edwards G, Taylor C, Cootes T. Interpreting face images using active appearance models Proceeding of the International Conference on Face and Gesture Recognition 1998, pp. 300-305.

T. F. Cootes, C. J. Taylor, D. H. Cooper, and J. Graham. Training models of shape from sets of examples. In Proceedings of BMVC'92, pp. 266-275, 1992.

S. C. Mitchell, J. G. Bosch, B. P. F. Lelieveldt, R. J. van der Geest, J. H. C. Reiber, and M. Sonka. 3-d active appearance models: Segmentation of cardiac MR and ultrasound images. IEEE Trans. Med. Imaging, 21(9):1167-1178, 2002.

T.F. Cootes, G. J. Edwards, and C. J. Taylor. Active appearance models. ECCV, 2:484-498, 1998.

T.F.Cootes, M.Ionita, C.Lindner and P. Sauer, "Robust and Accurate Shape Model Fitting using Random Forest Regression Voting", ECCV 2012.

A. Caunce, C.J.Taylor and T.F.Cootes, "Using Detailed Independent 3D Sub-Models to Improve Facial Feature Localisation and Pose Estimation" ISVC 2012.

M.Ionita, P.Tresadern and T.Cootes "Real Time Feature Point Tracking with Automatic Model Selection", International Workshop on Human-Computer Interaction, IEEE ICCV Workshops, pp. 453-460, 2011.

P.Sauer, T.Cootes, C.Taylor "Accurate Regression Procedures for Active Appearance Models", BMVC 2011.

A. Caunce, T.F.Cootes and C.J. Taylor, "Adding Facial Actions into a {3D} Model Search to Analyse Behaviour in an Unconstrained Environment", International Symposium on Visual Computing 2010, pp. 132-142.

T.F.Cootes, "Deformable Object Modelling and Matching", Proc ACCV2010.

P. Zhang and T.F.Cootes, "Automatic Learning Sparse Correspondences for Initialising Groupwise Registration", Proc. MICCAI 2010, vol. 2, pp. 635-642.

A. Caunce, T.F.Cootes and C.J. Taylor, "Improved 3D Model Search for Facial Feature Location and Pose Estimation in 2D images", Proc. British Machine Vision Conference 2010.

(56) References Cited

OTHER PUBLICATIONS

P. Tresadern, P. Sauer and T.F. Cootes, "Additive Update Predictors in Active Appearance Models", Proc. British Machine Vision Conference 2010.

R.H.Davies, C.J.Twining, T.F.Cootes and C.J.Taylor, "Building 3D Statistical Shape Models by Direct Optimisation" IEEE Trans. Medical Imaging (2010).

S.Adeshina and T.F.Cootes, "Constructing Part-based Models for Groupwise Registration", Proc. IEEE Int. Symp. on Biomedical Imaging (ISBI) 2010.

T.Williams, G.Vincent, T.F.Cootes, S.Balamoody, C.Hutchinson, J.Waterton, C.Taylor, "Automatic segmentation of bones and inter-image anatomical correspondence by volumetric statistical modelling of knee MRI", Proc. IEEE Int. Symp. on Biomedical Imaging (ISBI) 2010.

A.Caunce, D.Cristinacce, T.F.Cootes and C.J. Taylor, "Locating Facial Features and Pose Estimation Using a 3D Shape Model", 5th International Symposium on Visual Computing, 2009 pp. 750-761.

P. Tresadern, H. Bhaskar, S. Adeshina, C Taylor and T.F. Cootes "Combining Local and Global Shape Models for Deformable Object Matching", Proc. BMVC 2009 (PDF).

T.F. Cootes, C.J. Twining, K.O.Babalola and C.J. Taylor, "Diffeomorphic Statistical Shape Models", Image and Vision Computing, vol. 26, pp. 326-332.

D.Cristinacce and T.F.Cootes, "Automatic Feature Localisation with Constrained Local Models", Pattern Recognition vol. 41, No. 10, pp. 3054-3067.

M.G.Roberts, T.F.Cootes and J.E.Adams, "Robust Active Appearance Models with Iteratively Rescaled Kernels", Proc. British Machine Vision Conference, vol. 1, 2007, pp. 302-311.

D. Cristinacce and T.F. Cootes, "Boosted Regression Active Shape Models", Proc. British Machine Vision Conference, vol. 2, 2007, pp. 880-889.

V.S. Petrovic, T.F. Cootes, A.M. Mills, C.J.Twining and C.J.Taylor, "Automated Analysis of Deformable Structure in Groups of Images", Proc. British Machine Vision Conference, vol. 2, 2007, pp. 1060-1069.

R. Larsen, M.B. Stegmann, S.Darkner, S.Forchhammer, T.F. Cootes and Kjaer, "Texture enhanced appearance models", Computer Vision and Image Understanding, vol. 106(1),2007, pp. 20-30.

Babalola Ko, Cootes TF, Patenaude B, Rao A, Jenkinson M. "Comparing the similarity of statistical shape models using the Bhattacharya metric" Proc. MICCAI 2006 (vol. 1), pp. 142-150.

T.F.Cootes and C.J.Taylor, "An Algorithm for Tuning an Active Appearance Model to New Data", Proc. British Machine Vision Conference, vol. 3, pp. 919-928, 2006 (PDF).

D. Cristinacce and T.F.Cootes, "Feature Detection and Tracking with Constrained Local Models", Proc. British Machine Vision Conference, vol. 3, pp. 929-938, 2006.

P. Kittipanya-ngam and T.F. Cootes, "The effect of texture representations on AAM performance", Proc. International Conference on Pattern Recognition, vol. 2, pp. 328-331, 2006.

K. O. Babalola and T. F. Cootes, "Groupwise registration of richly labelled images.", Proc. Medical Image Understanding and Analysis, 2006. vol. 2, pp. 226-230.

D. Cristinacce and T.F. Cootes, "Facial Feature Detection and Tracking with Automatic Template Selection", Proc. 7th IEEE International Conference on Automatic Face and Gesture Recognition 2006, pp. 429-434.

T.F. Cootes, C.J. Twining, V.Petrovic, R.Schestowitz and C.J. Taylor, "Groupwise Construction of Appearance Models using Piece-wise Affine Deformations", Proc. British Machine Vision Conference,2005, vol. 2, pp. 879-888.

T.F. Cootes and C.J. Taylor, "Anatomical statistical models and their role in feature extraction", British Journal of Radiology, 2004, vol. 77, pp. S133-S139.

T.F. Cootes, C.J. Twining and C.J. Taylor, "Diffeomorphic Statistical Shape Models", Proc. British Machine Vision Conference 2004, vol. 1, pp. 447-456, (PDF).

D. Cristinacce, T.F. Cootes and I. Scott, "A Multistage Approach to Facial Feature Detection" Proc. British Machine Vision Conference 2004, vol. 1, pp. 277-286, (PDF).

T.F. Cootes, S. Marsland, C.J. Twining, K. Smith and C.J. Taylor, "Groupwise Diffeomorphic Non-rigid Registration for Automatic Model Building", Proc ECCV2004, pp. 316-327.

D.Cristinacce and T.F.Cootes, "A comparison of shape constrained facial feature detectors", Proc. Int. Conf on Face and Gesture Recognition, 2004, pp. 375-380. (PDF).

F. Bettinger and T.F.Cootes, "A Model of Facial Behaviour", Proc. Int. Conf on Face and Gesture Recognition, 2004, pp. 123-128. (PDF).

R.H.Davies, C.J.Twining, P.D.Allen, T.F.Cootes and C.J.Taylor, "Building optimal 2D Statistical Shape Models", Image and Vision Computing, vol. 21, pp. 117-182, 2003.

D. Cristinacce and T.F. Cootes, "Facial Feature Detection using ADABOOST with Shape Constraints", Proc.BMVC2003, vol. 1,pp. 231-240.

I.M. Scott, T.F.Cootes, C.J.Taylor, "Improving Appearance Model Matching Using Local Image Structure", Proc. Information Processing in Medical Imaging 2003, pp. 258-269.

P.A. Bromiley, N.A. Thacker, M.L.J. Scott, M.Pokric, A.J. Lacey and T.F. Cootes, "Bayesian and Non-Bayesian Probabilistic Models for Medical Image Analysis", Image and Vision Computing, vol. 21, No. 10, pp. 851-864, 2003.

T.F.Cootes, P.Kittipanya-ngam, "Comparing Variations on the Active Appearance Model Algorithm", Proc.BMVC2002, vol. 2, pp. 837-846. (Postscript) (PDF).

F. Bettinger, T.F. Cootes and C.J. Taylor, "Modelling Facial Behaviours", Proc.BMVC2002, vol. 2, pp. 797-806.

H. Kang, T.F. Cootes and C.J. Taylor, "A Comparison of Face Verification Algorithms using Appearance Models", Proc.BMVC2002, vol. 2,pp. 477-4862 (PDF).

T. F. Cootes, G.V.Wheeler, K.N. Walker and C. J. Taylor, "View-Based Active Appearance Models", Image and Vision Computing, vol. 20, 2002, pp. 657-664.

N.P.Costen, T.F.Cootes, G.J.Edwards, C.J.Taylor, "Automatic Extraction of the Face Identity-Subspace", Image and Vision Computing vol. 20, 2002, pp. 319-329.

R.H.Davies, C.J. Twining, T.F.Cootes, J. C.Waterton,C.J.Taylor, "3D Statistical Shape Models Using Direct Optimisation of Description Length", Proc.ECCV2002, vol. 3, pp. 3-20.

T.F.Cootes, N.A.Thacker and C.J.Taylor, "Automatic Model Selection by Modelling the Distributions of Residuals", Proc.ECCV2002, vol. 4, pp. 621-635.

K.N. Walker, T.F.Cootes and C.J.Taylor, "Automatically building appearance models from image sequences using salient features", Image and Vision Computing vol. 20, Issues 5-6, pp. 435-440.

R.H. Davies and C.Twining and T.F. Cootes and C.J. Taylor, "A Minimum Description Length Approach to Statistical Shape Modelling", IEEE Transactions on Medical Imaging vol. 21, pp. 525-537, 2002.

T.F. Cootes and C.J. Taylor, "Statistical models of appearance for medical image analysis and computer vision", Proc. SPIE Medical Imaging 2001.

T.F.Cootes and C.J.Taylor. "On Representing Edge Structure for Model Matching", Proc. CVPR 2001, vol. 1, pp. 1114-1119.

R.H. Davies, T.F. Cootes, C.Twining and C.J. Taylor, "An Information Theoretic Approach to Statistical Shape Modelling", Proc. British Machine Vision Conference 2001, pp. 3-11.

R.H. Davies, T.F. Cootes and C.J. Taylor, "A Minimum Description Length Approach to Statistical Shape Modelling", Proc. Information Processing in Medical Imaging 2001, pp. 50-63.

R.H. Davies, T.F. Cootes, J.C. Waterton and C.J. Taylor, "An Efficient Method of Constructing Optimal Statistical Shape Models", Proc MICCAI, pp. 57-65, 2001.

T.F.Cootes and C.J.Taylor. "Constrained Active Appearance Models" Proc. ICCV 2001. vol. I. pp. 748-754.

T.F.Cootes, G.J. Edwards and C.J.Taylor. "Active Appearance Models", IEEE PAMI, vol. 23, No. 6, pp. 681-685, 2001.

T.F. Cootes, G.V.Wheeler, K.N. Walker and C.J.Taylor "Coupled-View Active Appearance Models", Proc. British Machine Vision Conference 2000, vol. 1,pp. 52-61.

(56) References Cited

OTHER PUBLICATIONS

T.F. Cootes and C.J. Taylor, "Combining Elastic and Statistical Models of Appearance Variation", Proc. European Conference on Computer Vision, 2000, vol. 1, pp. 149-163.

T.F. Cootes, K.N. Walker and C.J.Taylor, "View-Based Active Appearance Models", Proc. Int. Conf. on Face and Gesture Recognition, 2000. pp. 227-232.

K.N. Walker, T.F. Cootes, and C.J.Taylor, "Automatically Building Appearance Models", Proc. Int. Conf. on Face and Gesture Recognition, 2000. pp. 271-276.

T.F. Cootes and C.J. Taylor, "A Mixture Model for Representing Shape Variation", Image and Vision Computing 17, No. 8, 1999, pp. 567-574.

T.F. Cootes, G. J. Edwards and C. J. Taylor, "Comparing Active Shape Models with Active Appearance Models", Proc. British Machine Vision Conference (ed T.Pridmore, D.Elliman), vol. 1, 1999, pp. 173-182.

K. N. Walker and T.F. Cootes and and C. J. Taylor, "Automatically Building Appearance Models from Image Sequences using Salient Features", Proc. British Machine Vision Conference (ed T.Pridmore, D.Elliman), vol. 2, 1999 pp. 463-562.

G.J. Edwards and T. F. Cootes and C. J. Taylor, "Advances in Active Appearance Models". Proc International Conference on Computer Vision, pp. 137-142, 1999.

G.J.Edwards, C.J.Taylor, T.F.Cootes, "Interpreting Face Images using Active Appearance Models", Int. Conf on Face and Gesture Recognition 1998. pp. 300-305.

G.J.Edwards, C.J.Taylor, T.F.Cootes, "Learning to Identify and Track Faces in Image Sequences", Int. Conf. On Face and Gesture Recognition 1998.pp. 260-265.

T.F.Cootes, G.J. Edwards and C.J.Taylor. "Active Appearance Models", in Proc. European Conference on Computer Vision 1998 (H.Burkhardt & B. Neumann Ed.s). vol. 2, pp. 484-498, Springer, 1998.

G.J. Edwards, T.F. Cootes and C.J. Taylor, "Face Recognition Using Active Appearance Models", in Proc. European Conference on Computer Vision 1998 (H.Burkhardt & B. Neumann Ed.s). vol. 2, pp. 581-695, Springer, 1998.

K. N. Walker, T.F. Cootes and C. J. Taylor. "Locating Salient Object Features", in Proc. British Machine Vision Conference, 1998, (Eds: P.H. Lewis and M.S. Nixon) vol. 2, pp. 557-566, BMVA Press, 1998.

T.F. Cootes, G. J. Edwards and C. J. Taylor. "A Comparative Evaluation of Active Appearance Model Algorithms", in Proc. British Machine Vision Conference, 1998, (Eds: P.H. Lewis and M.S. Nixon) vol. 2, pp. 680-689, BMVA Press, 1998.

P.D. Sozou, T.F. Cootes, C.J. Taylor and E.C. Di Mauro, "Non-linear Point Distribution Modelling using a Multi-layer perceptron", Image and Vision Computing vol. 15, No. 6, pp. 457-463, 1997.

T. Ahmad, C.J.Taylor, A.Lanitis, T.F.Cootes. "Tracking and Recognising Hand Gestures using Statistical Shape Models." Image and Vision Computing, vol. 15, No. 5, pp. 345-352, 1997.

C.J.Taylor, T.F.Cootes, A.Lanitis, G.Edwards, P.Smyth and A.C.W. Kotcheff. "Model-Based Interpretation of Complex and Variable Images." Phil. Trans. R. Soc. Lond. B(1997) 352,1267-74.

A.Lanitis, C.J.Taylor, T.F.Cootes, Automatic Interpretation and Coding of Face Images Using Flexible Models. IEEE PAMI vol. 19 No. 7 pp. 743-756, Jul. 1997.

T.F.Cootes, C.J.Taylor. A Mixture Model for Representing Shape Variation. Proc 8th BMVC (vol. 1) (Ed. A.F.Clark) BMVA Press, pp. 110-119. 1997.

G.J.Edwards, C.J.Taylor and T.F. Cootes. Learning to Identify and Track Faces in Image Sequences. Proc 8th BMVC (vol. 1) (Ed. A.F.Clark) BMVA Press, pp. 130-139. 1997.

K.N.Walker, T.F.Cootes and C.J.Taylor. Correspondence Using Distinct Points Based on Image Invariants. Proc 8th BMVC (vol. 1) (Ed. A.F.Clark) BMVA Press, pp. 540-549. 1997.

T.F.Cootes, E.Di Mauro, C.J.Taylor, Flexible 3D Models from Uncalibrated Cameras. Image and Vision Computing. 14 (8) Aug. 1996, pp. 581-587.

T.F.Cootes, G.J.Page, C.B.Jackson, C.J.Taylor, "Statistical Grey-Level Models for Object Location and Identification." Image and Vision Computing 14 (8) Aug. 1996, pp. 533-540.

A.Hill, T.F.Cootes, C.J.Taylor. "Active Shape Models and the shape approximation problem." Image and Vision Computing. 14 (8) Aug. 1996 pp. 601-608.

T.F.Cootes,C.J.Taylor. Locating Objects of Varying Shape using Statistical Feature Detectors. Proc. European Conference on Computer Vision (B.Buxton Ed.). pp. 465-474, Springer-Verlag, 1996.

T.F.Cootes,C.J.Taylor. Data Driven Refinement of Active Shape Model Search. in Proc. British Machine Vision Conference. (Ed. R.B.Fisher and E.Trucco), BMVA Press, 1996, pp. 383-392.

E.C.Di Mauro, T.F.Cootes,C.J.Taylor, A.Lanitis. Active Shape Model Search using pairwise Geometric Histograms. in Proc. British Machine Vision Conference. (Ed. R.B.Fisher and E.Trucco), BMVA Press, 1996, pp. 353-362.

G.J.Edwards, A.Lanitis, C.J.Taylor, T.F.Cootes. Statistical Models of Face Images. in Proc. British Machine Vision Conference. (Ed. R.B. Fisher and E.Trucco), BMVA Press, 1996, pp. 765-774.

A. Lanitis, P.D. Sozou, C.J. Taylor, T.F. Cootes, and E. C Di Mauro, "A General Non-Linear Method for Modelling Shape and Locating Image Objects", Procs. of the International Conference of Pattern Recognition, vol. 4, pp. 266-270, IEEE Computer Society Press, Vienna, Austria, 1996.

T.F.Cootes, C.J.Taylor. Locating Faces Using Statistical Feature Detectors. Proc 2nd Int.Conf. on Automatic Face and Gesture Recognition, IEEE Comp.Soc. Press, Los Alamitos, CA, 1996. pp. 204-209.

G.J.Edwards, A.Lanitis, C.J.Taylor, T.F.Cootes. Modelling the Variability in Face Images. Proc 2nd Int.Conf. on Automatic Face and Gesture Recognition, IEEE Comp.Soc. Press, Los Alamitos, CA, 1996. pp. 328-333.

T.F. Cootes, D. Cooper, C.J. Taylor and J. Graham, "Active Shape Models—Their Training and Application." Computer Vision and Image Understanding. vol. 61, No. 1, Jan. 1995, pp. 38-59.

A.Lanitis, C.J.Taylor, T.F.Cootes, "An automatic face identification system using flexible appearance models." Image and Vision Computing vol. 13 No. 5 Jun. 1995. pp. 393-402.

T.F.Cootes , C.J.Taylor, "Combining point distribution models with shape models based on finite element analysis." Image and Vision Computing vol. 13, No. 5 Jun. 1995. pp. 403-409.

A. Lanitis, C.J. Taylor, T.F.Cootes, A. Ahmad, Automatic Interpretation of Human Faces and Hand Gestures using Flexible Models. Proc. International Workshop on Automatic Face and Gesture Recognition, Zurich, Switzerland, (Ed. M.Bichsel), 1995, pp. 98-103.

A.Lanitis, A. Hill, T.F.Cootes, C.J.Taylor. Locating Facial Features using Genetic Algorithms Proc. International Conference on Digital Signal Processing, Cyprus, 1995. pp. 520-525.

A.Lanitis,C.J.Taylor, T.F.Cootes. A Unified Approach to Coding and Interpretting Faces. Proc. 5th International Conference on Computer Vision. 1995. pp. 368-373.

P.D. Sozou, T.F. Cootes, C.J. Taylor and E.C. Di Mauro, "A non-linear Generalisation of Point Distribution Models using Polynomial Regression", Image and Vision Computing Journal, vol. 13, No. 5, Jun. 1995, pp. 451-457.

T.F.Cootes, G.J.Page, C.B.Jackson, C.J.Taylor, Statistical Grey-Level Models for Object Location and Identification. in Proc. British Machine Vision Conference. (Ed. D.Pycock), BMVA Press, 1995, pp. 533-542. (pdf).

T.F.Cootes, E.Di Mauro, C.J.Taylor, Flexible 3D Models from Uncalibrated Cameras in Proc. British Machine Vision Conference. (Ed. D.Pycock), BMVA Press, 1995, pp. 147-156.

P.D. Sozou, T.F.Cootes, C.J.Taylor and E.C. Di Mauro. Non-Linear Point Distribution Modelling Using a Multi-Layer Perceptron. in Proc. British Machine Vision Conference. (Ed. D.Pycock), BMVA Press, 1995, pp. 107-116.

A.Hill, T.F.Cootes and C.J.Taylor. Active Shape Models and the Shape Approximation Problem. in Proc. British Machine Vision Conference. (Ed. D.Pycock), BMVA Press, 1995, pp. 157-166.

T. Ahmad, C.J.Taylor, A.Lanitis, T.F.Cootes. Tracking and Recognising Hand Gestures using Statistical Shape Models. in Proc. British Machine Vision Conference. (Ed. D.Pycock), BMVA Press, 1995, pp. 403-412.

(56) References Cited

OTHER PUBLICATIONS

T.F.Cootes, A.Hill, C.J.Taylor, Medical Image Interpretation Using Active Shape Models : Recent Advances. 14th International Conference on Information Processing in Medical Imaging, 1995, pp. 371-372.

T.F. Cootes, D. Cooper, C.J. Taylor and J. Graham, Image search using trained flexible shape models, Advances in Applied Statistics: Statistics and Images: 2. Ed.K.V.Mardia, Carfax Publishing Company, 1994, pp. 111-139.

T.F.Cootes , C.J.Taylor, Combining point distribution models with shape models based on finite element analysis. In Proc. British Machine Vision Conference, 1994, pp. 419-428.

T.F.Cootes , C.J.Taylor, Modelling object appearance using the grey-level surface. In Proc. British Machine Vision Conference, 1994, pp. 479-488.

T.F.Cootes , C.J.Taylor, A.Lanitis, Active Shape Models : Evaluation of a Multi-Resolution Method for Improving Image Search, in Proc. British Machine Vision Conference, 1994, pp. 327-336.

J.Haslam, C.J.Taylor, T.F.Cootes, A Probabalistic Fitness Measure for Deformable Template Models, in Proc. British Machine Vision Conference. , BMVA Press, 1994, pp. 33-42.

A.Lanitis, C.J.Taylor, T.F.Cootes, An automatic face identification system using flexible appearance models. In Proc. British Machine Vision Conference. , BMVA Press, 1994, pp. 66-75.

P.D.Sozou, T.F.Cootes, C.J.Taylor, A non-linear generalisation of point distribution models using polynomial regression. In Proc. British Machine Vision Conference. , BMVA Press, 1994, pp. 397-406.

T.F.Cootes , C.J.Taylor, A.Lanitis, Using Grey-Level Models to Improve Active Shape Model Search, Proc. International Conference on Pattern Recognition vol. I, Jerusalem, Oct. 1994. pp. 63-67.

T.F.Cootes , C.J.Taylor, A.Lanitis, Multi-Resolution Search with Active Shape Models, Proc. International Conference on Pattern Recognition vol. I., Jerusalem, Oct. 1994. pp. 610-612.

A.Lanitis, C.J.Taylor, T.F.Cootes, Automatic Tracking, Coding and Reconstruction of Human Faces using Flexible Appearance Models, IEE Electronic Letters 30, pp. 1578-1579. 1994.

T.F.Cootes, C.J.Taylor, A.Lanitis, D.H.Cooper and J Graham, Building and Using Flexible Models Incorporating Grey-Level Information. Proc. Fourth International Conference on Computer Vision, IEEE Computer Society Press, 1993, pp. 242-246.

T.F.Cootes, C.J.Taylor, A.Hill and J.Haslam,the Use of Active Shape Models for Locating Structures. Proc. 13th International Conference on Information Processing in Medical Imaging, (Eds. H.H.Barrett, A.F.Gmitro) Springer-Verlag, 1993, pp. 33-47.

T.F.Cootes, C.J.Taylor, Active Shape Model Search using Local Grey-Level Models: A Quantitative Evaluation, in Proc. British Machine Vision Conference, (Ed J.Illingworth), BMVA Press, 1993, pp. 639-648.

A.Ratter, O.Baujard, C.J.Taylor and T.F.Cootes, A Distributed Approach to Image Interpretation Using Model-Based Spatial Reasoning. In Proc. British Machine Vision Conference. , BMVA Press, 1993, pp. 319-328.

Hiroki Watanabe, et al., "Detection and Estimation of Omni-Directional Pointing Gestures using Multiple Cameras", MVA2000 IAPR Workshop on Machine Vision Applications. Nov. 28-30, 2000, The University of Tokyo, Japan.

B. Stenger, et al., "Model-Based Hand Tracking Using an Unscented Kalman Filter", Proc. British Machine Vision Conference, vol. I, pp. 63-72 (2001).

J. Richarz, et al., "A Monocular Pointing Pose Estimator for Gestural Instruction of a Mobile Robot", International Journal of Advanced Robotic Systems, vol. 4, No. 1 pp. 139-150 (2007).

E. Littmann, et al., "Robot guidance by Human Pointing Gestures", (1996) CiteseerX 10.1.1.45.3514.

Kai Nickel, et al., "Recognition of 3D-Pointing Gestures for Human-Robot-Interaction", Proceedings of Humanoids 2003, Karlsruhe, Germany (2003).

Hossein Mobahi et al., "Fast Initialization of Active Contours—Towards Practical Visual Interfaces for Human-Robot Interaction", IEEE Proc. Intelligent Robots and Systems, 2004. (IROS 2004).

Chang-Beom Park et al., "Real-Time 3D Pointing Gesture Recognition in Mobile Space", IEEE 8.sup.th International Conference on Automatic Face & Gesture Recognition, 2008. FG (2008).

Maria Joao M. Vasconcelos et al., "Automatic Modelling Image Represented Objects Using a Statistic Based Approach", in The European Simulation and Modelling Conference (ESM), Porto, Portugal, pp. 7-12, 2005.

Joao Manuel R. S. Tavares, et al., "Computer Analysis of Objects' Movement in Image Sequences: Methods and Applications", Artigo em Revista Cientifica Internacional, hdl.handle.net/10216/21527, call No. 25189, repositorio-aberto.up.pt/handle/10216/21527, (2009).

Tavares, Joao Manuel R. S.; Carvalho, Fernando; Oliveira, Francisco; Reis, Ilda; Vasconcelos, Maria Joao M.; Goncalves, Patricia; Pinho, Raquel; Ma, Zhen (2009)—Computer analysis of objects' movement in image sequences: methods and applications. International Journal for Computational Vision and Biomechanics ISSN 0973-6778. 1:2, p. 209-220.

Maria Joao M. Vasconcelos, et al., "Methods to Automatically Build Point Distribution Models for Objects like Hand Palms and Faces Represented in Images", (2008) repositorio-aberto.up.pt/bitstream/10216/6858/2/16567.pdf.

Reinhard Beichel, et al., "Robust Active Appearance Model Matching", In Bildverarbeitung fur die Medizin 2005. Springer.

Jie Ma, et al., "Global Structure Constraint: A Fast Pre-location for Active Appearance Model", Advances in Intelligent and Soft Computing, 2009, vol. 116/2009, 433-441, DOI: 10.1007/978-3-642-03156-4.sub.--44.

Masaaki Fukumoto, et al., "'Finger-Pointer': Pointing Interface by Image Processing", Comput. & Graphics. vol. I8. No. 5. pp. 633-642 (1994) Elsevier Science Ltd.

Sebastien Carbini, et al., "Pointing Gesture Visual Recognition for Large Display", Pointing'04 ICPR Workshop, Cambridge, United Kingdom, Aug. 22, 2004.

S. Carbini, J.E. Viallet, O. Bernier, "Pointing Gesture Visual Recognition by Body Feature Detection and Tracking", ICCVG (International Conference on Computer Vision and Graphics 2004), Warszawa, Poland, Sep. 22-24, 2004.

S. Carbini, J.E. Viallet, O. Bernier, "Simultaneous Body Parts Statistical Tracking for Bi-Manual Interactions", ORASIS, Fournol, France, May 24-27, 2005.

S. Carbini, J.E. Viallet, L. Delphin-Poulat, "MOWGLI: Multimodal Oral With Gesture Large display Interface", GW (Gesture Workshop), Berder Island, France, May 18-20, 2005.

S. Carbini, L. Delphin-Poulat, L Perron, J.E. Viallet, "From a Wizard of Oz Experiment to a Real Time Speech and Gesture Multimodal Interface", (prospective submission) Special issue of Signal Processing (ELSEVIER) on Multimodal Human Computer Interfaces, Jan. 2006.

Yoichi Sato, et al., "Real-Time Input of 3D Pose and Gestures of a User's Hand and Its Applications for HCI", IEEE Proc. Virtual Reality, 2001. pp. 79-86 (2001).

Cornelius Malerczyk, "Interactive Museum Exhibit Using Pointing Gesture Recognition", WSCG'2004, Feb. 2-6, 2004, Plzen, Czech Republic.

Roland Kehl, et al., "Real-Time Pointing Gesture Recognition for an Immersive Environment", Sixth IEEE International Conference on Automatic Face and Gesture Recognition (FG'04) pp. 577 (2004).

Thomas B. Moeslund, et al., "A Natural Interface to a Virtual Environment through Computer Vision-estimated Pointing Gestures", GW '01 Revised Papers from the International Gesture Workshop on Gesture and Sign Languages in Human-Computer Interaction, pp. 59-63 (2001).

Kai Nickel, et al., "Real-time Recognition of 3D-Pointing Gestures for Human-Machine-Interaction", in Proc. DAGM-Symposium, 2003, pp. 557-565.

P. Serafinavi{hacek over (c)}ius, "Estimating Characteristic Points of Human Body for Automatic Hand Pointing Gesture Recognition", Electronics and Electrical Engineering Medicine Technology ISSN 1392-1215 No. 8(80) T 115 (2007).

(56) References Cited

OTHER PUBLICATIONS

Vladimir I. Pavlovic, "Visual Interpretation of Hand Gestures for Human-Computer Interaction: A Review", IEEE Transactions on Pattern Analysis and Machine Intelligence, vol. 19, No. 7, 677-695, (1997).
Yasuo Ariki, et al., "Recognition of Handsfree Speech and Hand Pointing Action for Conversational TV", ACM MM'05, Nov. 6-11, 2005, Singapore.
Kai Nickel, et al., "Real-time Person Tracking and Pointing Gesture Recognition for Human-Robot Interaction", CVHCI04(28-38) Lecture Notes in Computer Science, vol. 3058, 2004, DOI: 10.1007/b97917, Computer Vision in Human-Computer Interaction, ECCV 2004 Workshop on HCI, Prague, Czech Republic, May 16, 2004. Proceedings, Nicu Sebe, Michael Lew and Thomas S. Huang Eds. (2004).
B. Stenger, et al., "Model-Based 3D Tracking of an Articulated Hand", Proc. IEEE Conf. Computer Vision and Pattern Recognition, CVPR 2001, vol. 2, pp. II-310-II-315 (2001).
Nickel, K., et al., "3D-tracking of head and hands for pointing gesture recognition in a human-robot interaction scenario", IEEE AFGR04(565-570) (2004).
K. Nickel, et al., "Visual recognition of pointing gestures for human—robot interaction", Image Vis. Comput. (2006), doi:10.1016/j.imavis.2005.12.020 (2006).
Shin Sato, et al., "A Human-Robot Interface Using an Interactive Hand Pointer that Projects a Mark in the Real Work Space", Proc. IEEE International Conf. on Robotics and Automation, 2000. Proceedings. ICRA '00. vol. 1, pp. 589-595 (2000).
Nebojsa Jojic, "Detection and Estimation of Pointing Gestures in Dense Disparity Maps", International Conference on Automatic Face and Gesture Recognition, France (2000).
Ali Erol, et al., "Vision-based hand pose estimation: A review", Computer Vision and Image Understanding 108:52-73 (2007).
Kai Nickel, et al., "Pointing Gesture Recognition based on 3D Tracking of Face, Hands and Head Orientation", ICMI'03, Nov. 5-7, 2003, Vancouver, British Columbia, Canada (2003).
B. Stenger, et al., "Hand Pose Estimation Using Hierarchical Detection", Intl. Workshop on Human-Computer Interaction, pp. 102-112 (2004).
Carlo Colombo, et al., "Visual Capture and Understanding of Hand Pointing Actions in a 3-D Environment", IEEE Transactions on Systems, Man, and Cybernetics—Part B: Cybernetics, vol. 33, No. 4, Aug. 2003 pp. 677-686 (2003).
Jakob Segen, et al., "Shadow Gestures: 3D Hand Pose Estimation using a Single Camera", IEEE Conf. Computer Vision and Pattern Recognition, 1999. vol. 1 (1999).
Philippe Vindras, et al., "Pointing Errors Reflect Biases in the Perception of the Initial Hand Position", AJP-JN Physiol Jun. 1998 vol. 79 No. 6 3290-3294 (1998).
Kerdvibulvech, C. et al., "Model-Based Hand Tracking by Chamfer Distance and Adaptive Color Learning Using Particle Filter", JIVP, No. 2009:724947 (2009).
Park, C.B., et al., "Real-time 3D pointing gesture recognition for mobile robots with cascade HMM and particle filter", IVC(29), No. 1, Jan. 2011, pp. 51-63.
Gallo, O., et al., "Camera based pointing interface for mobile devices", ICIP08(1420-1423). (2008).
Barrho, J., et al., "Finger Localization and Classification in Images based on Generalized Hough Transform and Probabilistic Models", ICARCV06(1-6) (2006).
Argyros, A.A., et al., "Binocular Hand Tracking and Reconstruction Based on 2D Shape Matching", ICPR06(I: 207-210) (2006).
Argyros, A.A., et al., "Vision-Based Interpretation of Hand Gestures for Remote Control of a Computer Mouse", CVHCI06(40-51) (2006).
Hossain, M., et al., "Recognizing Hand-Raising Gestures using HMM", CRV05(405-412) (2005).
Hosoya, E., et al., "Arm-Pointer: 3D Pointing Interface for Real-World Interaction", CVHCI04(72-82) (2004).
Chandran, S , et al., "Real-Time Detection and Understanding of Isolated Protruded Fingers", RealTimeHCI04(152) (2004).
Kehl, R., et al., "Real-time pointing gesture recognition for an immersive environment", AFGR04(577-582) (2004).
Yamamoto, Y., et al., "Arm-pointing gesture interface using surrounded stereo cameras system", ICPR04(IV: 965-970) (2004).
Hild, M., et al., "Object recognition via recognition of finger pointing actions", CIAP03(88-93) (2003).
Lee, M.S., et al., "A Computer Vision System for On-Screen Item Selection by Finger Pointing", CVPR01(I:1026-1033) (2001).
Jojic, N., et al., "Detection and estimation of pointing gestures in real-time stereo sequences", AFGR00(468-475) (2000).
Wu, A., et al., "A Virtual 3D Blackboard: 3D Finger Tracking using a Single Camera", AFGR00(536-543) (2000).
Gherbi, R., et al., "Interpretation of Pointing Gesture: The PoG System", GW99(153) (1999).
Bretzner, L., et al., "Use Your Hand as a 3-D Mouse or Relative Orientation from Extended Sequences of Sparse Point and Line Correspondences Using the Affine Trifocal Tensor", ECCV98(I: 141) (1998).
Hung, Y.P., et al., "Free-Hand Pointer by Use of an Active Stereo Vision System", ICPR98(vol. II: 1244-1246) (1998).
Sifang, L., et al., "A real-time monocular vision-based 3D mouse system", CAIP97(448-455) (1997).
iris.usc.edu/vision-notes/bibliography/people926.html (Aug. 2, 2012).
Kaoning Hu et al, "Hand Pointing Estimation for Human Computer Interaction Based on Two Orthogonal-Views", Aug. 23-26, 2010, Turkey.
Michael Reale et al, Pointing with the Eyes: Gaze Estimation Using a Static/Active Camera System and 3D Iris Disk Model, Jul. 19-23, 2010, Singapore.

* cited by examiner

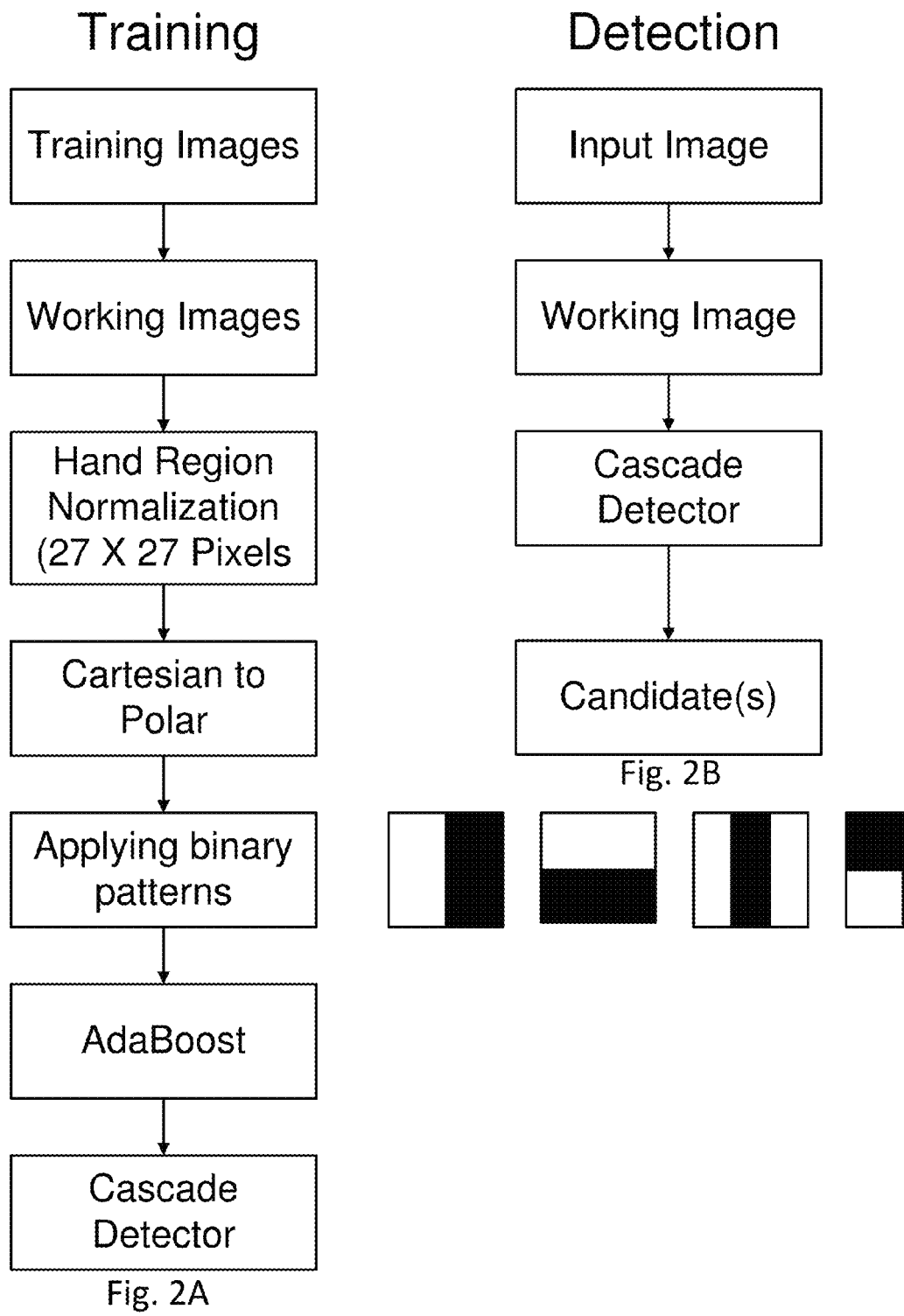

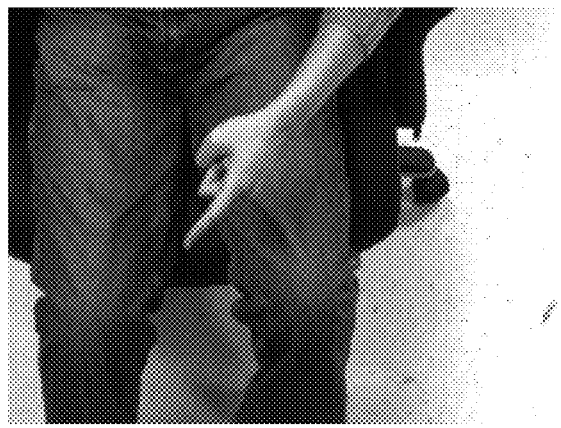 
Fig. 3A          Fig. 3B
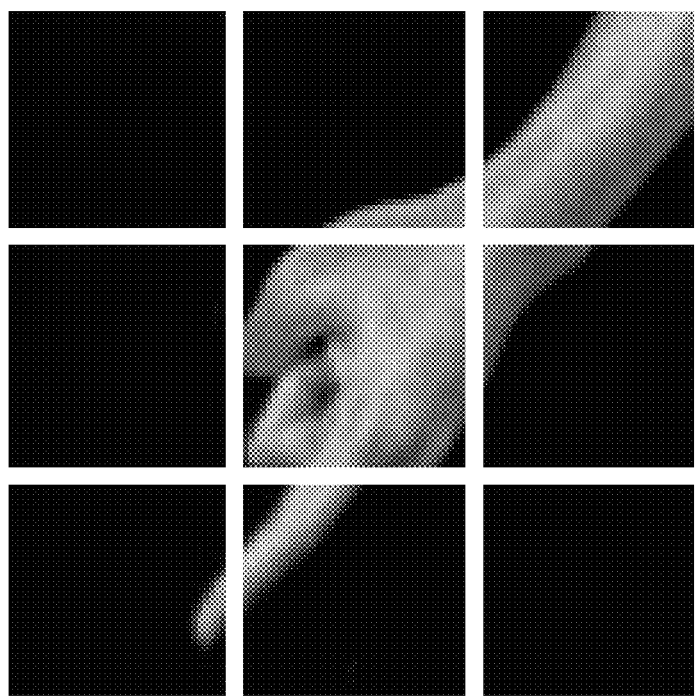
Fig. 3C

HAND POINTING ESTIMATION FOR HUMAN COMPUTER INTERACTION

CROSS REFERENCE TO RELATED APPLICATION

The present application is a Continuation of U.S. patent application Ser. No. 14/635,094, filed Mar. 2, 2015, now U.S. Pat. No. 9,128,530, issued Sep. 8, 2015, which is a Continuation of U.S. patent application Ser. No. 13/571,645, filed Aug. 10, 2012, now U.S. Pat. No. 8,971,572, issued Mar. 3, 2015, which is a Nonprovisional of U.S. Provisional Patent application 61/523,152, filed Aug. 12, 2011, each of which is expressly incorporated herein by reference in its entirety.

STATEMENT OF GOVERNMENT RIGHTS

This work was funded by grant FA8750-08-01-0096 from the Unites States Air Force. The government may have certain rights in the invention.

BACKGROUND OF THE INVENTION

Hand gesture is an efficient means for humans interacting with computers [9, 13, 17]. The most basic and simplest gesture is pointing. Pointing gesture can resolve ambiguities derived from the verbal communication, thus opening up the possibility of humans interacting or communicating intuitively with computers or robots by indicating objects or pointed locations either in the three dimensional (3D) space or on the screen. However, it is a challenging task to estimate the 3D hand pointing direction automatically and reliably from the streams of video data due to the great variety and adaptability of hand movement and the undistinguishable hand features of the joint parts. Some previous work show the success in hand detection and tracking using multi-colored gloves [16] and depth-aware cameras [8], or background subtraction[14], color-based detection[7, 8], stereo vision based [2, 4, 18] or binary pattern based [5, 10] hand feature detection. However, the big challenge remains for accurate hand detection and tracking in terms of various hand rotations.

Recent advances of feature detection[1, 5, 6, 8, 10, 11, 12, 19] make possible determination of hand gestures.

An expectation minimization framework for view independent recognition of hand postures is provided in [21]. This is intended to determine a gesture, and not a pointing direction.

SUMMARY AND OBJECTS OF THE INVENTION

Hand pointing has been an intuitive gesture for human interaction with computers. Big challenges are still posted for accurate estimation of finger pointing direction in a 3D space. The present technology provides a hand pointing estimation system based on two regular cameras, which includes hand region detection, hand finger estimation, two views' feature detection, and 3D pointing direction estimation. The hand detection system has similarities to a binary pattern face detector, in which a polar coordinate system is proposed to represent the hand region, and achieved a good result in terms of the robustness to hand orientation variation. To estimate the pointing direction, an Active Appearance Model (AAM) based approach was applied to detect and track 14 feature points along the hand contour from a top view and a side view. Combining two views of the hand features, the 3D pointing direction is estimated. See, Kaoning Hu et at, "Hand Pointing Estimation for Human Computer Interaction Based on Two Orthogonal-Views", IEEE International Conference on Pattern Recognition p. 3670-3673 (2010): Reale, M. J., "A Multi-Gesture Interaction System Using a 3-D Iris Disk Model for Gaze Estimation and an Active Appearance Model for 3-D Hand Pointing", IEEE Transactions on Multimedia, June 2011; Air Force Research Laboratory, information Directorate "Real Time Eye Tracking And Hand Tracking Using Regular Video Cameras For Human Computer Interaction", State University of New York at Binghamton (January 2011), Final Technical report, expressly incorporated herein by reference in their entirety.

The Active Appearance Model (AAM) is a generalization of the Active Shape Model approach, but uses all the information in the image region covered by the target object, rather than just that near modeled edges. An AAM contains a statistical model of the shape and. grey-level (or by extension, color) appearance of the object of interest which can generalize to almost any valid example. Matching to an image involves finding model parameters which minimize the difference between the image and a synthesized model example, projected into the image. The model has a potentially large number of parameters. Displacing each model parameter from the correct value induces a particular pattern in the residuals. In a training phase, the AAM learns a linear model of the relationship between parameter displacements and the induced residuals. During search it measures the residuals and uses this model to correct the current parameters, leading to a better fit. A good overall match is obtained in a few iterations, even from poor starting estimates. See personalpages.manchester.ac.uk/staff/timothy.f.cootes/tfc_publications.html In AAM, principal component analysis (PCA) may be used to find the mean shape and main variations of the training data to the mean shape. After finding the Shape Model, all training data objects are deformed to the main shape, and the pixels converted to vectors. Then PCA is used to find the mean appearance (intensities), and variances of the appearance in the training set. Both the Shape and Appearance Model are combined with PCA to one AAM-model. By displacing the parameters in the training set by a known amount, a model can be created that provides an optimal parameter update for a certain difference in model-intensities and normal image intensities.

It is understood that a single image plus depth information, such as available from a Microsoft Kinect (Primesense) system, or other 3D acquisition system, may be employed. See, US20120124516; US20120169583; US20120078614; US20120070070; US20120038986; US20110293137; US 20110025827; US20110292036; US20110052006; US20100284082; 20100265316; US20110158508; US20110211044; US20090185274; US20100284082; U.S. Ser. No. 09/616,606; U.S. Pat. Nos. 6,101,269; 7,348,963; WO2007/043036, WO2007/132451; WO2007/105205, WO2008/120217, WO2010/004542, WO2007/043036; WO2007/105205; WO03/071410; PCT/IL2006/000335; TW 527528 B; Sazbon et al., "Qualitative Real-Time Range Extraction for Preplanned Scene Partitioning Using Laser Beam Coding," Pattern Recognition Letters 26, pages 1772-1781 (2005); Garcia et al., "Three-dimensional mapping and range measurement by means of projected speckle patterns", Applied Optics, Vol. 47, No. 16, pages 3032-3040 (2008); Garcia et el., "Projection of speckle patterns for 3D sensing", by Journal of Physics, Conference series 139 (2008), each of which is expressly incorporated herein by reference. See also U.S. Pat. Nos. 4,988,981; 4,550,250; 6,452,584; 5,549,469; 7,821,541; US20080256494; and WO2007/043036, each of which is expressly incorporated herein by reference. Another method of three-dimensional imaging uses time-of-flight (TOF) information to create a dense depth map. See, US20110296353; U.S. Pat. Nos. 6,323,942; 6,515; 6,522, 395; 6,614,422; 6,674,895; 6,678,039; 6,710,770; 6,906,793; 7,151,530; 7,176,438; 7,212,663; 7,321,111; 7,340,077; 7,352,454; 7,507,947, each of which is expressly incorporated herein by reference.

The present technology provides a system and method to estimate pointing direction, e.g., based on two orthogonal-view cameras, or a plurality of images representing parallax views.

A system and method for hand gesture recognition, and more particularly, according to a preferred embodiment, finger pointing direction estimation, is provided. A preferred embodiment has a high degree of robustness to hand rotation. By using multiple camera views to capture a hand, the hand can be tracked and modeled via AAM. Using the tracked points from the AAM allows inference of the 3D orientation of the pointing finger, due to the correspondence between points on the finger of both views.

In like manner, other types of gestures may be recognized. Thus, for example, the vectors or change in vectors over time, of one or more fingers or other portions of the hand and wrist may be determined or measured. Thus, multi-finger gestures or gesticulations are supported. For example, a variety of gestures involving multiple fingers are supported by Apple Corp. OSX and iOS4. See, e.g., www.apple.com/macosx/whats-new/gestures.html; support.apple.com/kb/HT3211. The present system and method may be implemented to recognize similar or corresponding gestures, among others, with our without physical contact. See also, U.S. Pat. Nos. 7,975, 242; 7,966,578; 7,957,762; 7,956,849; 7,941,760; 7,940,250; 7,934,156; 7,932,897; 7,930,642; 7,864,163; 7,844,914; 7,843,427; 7,812,828; 7,812,826; 7,800,592; 7,782,307; 7,764,274; 7,705,830; 7,688,315; 7,671,756; 7,663,607; 7,656,394; 7,656,393; 7,653,883; RE40,993; 7,619,618; 7,614,008; 7,593,000; 7,538,760; 7,511,702; 7,509,588; 7,479,949; 7,469,381; RE40,153; 7,339,580; 7,975,242; 7,966,578; 7,961,909; 7,958,456; 7,957,762; 7,956,849; 7,956,847; 7,956,846; 7,941,760; 7,940,250; 7,936,341; 7,934,156; 7,932,897; 7,932,896; 7,924,272; 7,924,271; 7,921,187; 7,920,134; 7,918,019; 7,916,126; 7,910,843; 7,907,125; 7,907,117; 7,907,020; 7,903,115; 7,902,840; 7,890,778; 7,889,185; 7,889,184; 7,889,175; 7,884,804; RE42,064; 7,877,707; 7,876,311; 7,876,288; 7,872,652; 7,870,496; 7,864,163; 7,859,521; 7,856,605; 7,844,915; 7,844,914; 7,843,427; 7,840,912; 7,835,999; 7,834,846; 7,826,641; 7,812,828; 7,812,826; 7,809,167; 7,793,228; 7,793,225; 7,786,975; 7,782,307; 7,777,732; 7,764,274; 7,760,767; 7,754,955; 7,728,821; 7,728,316; 7,719,523; 7,714,265; 7,711,681; 7,710,391; 7,705,830; 7,694,231; 7,692,629; 7,671,756; 7,667,148; 7,663,607; 7,657,849; 7,656,394; 7,656,393; 7,653,883; 7,633,076; RE40,993; 7,619,618; 7,614,008; 7,599,520; 7,593,000; 7,574,672; 7,538,760; 7,511,702; 7,509,588; 7,480,870; 7,479,949; 7,469,381; RE40,153; 7,339,580; 7,030,861; 6,888,536; 6,323,846; 20110163955; 20110157029; 20110145863; 20110145768; 20110145759; 20110145739; 20110141142; 20110141031; 20110102464; 20110080361; 20110080360; 20110080344; 20110078624; 20110078622; 20110078597; 20110078560; 20110074830; 20110074828; 20110074710; 20110074699; 20110074698; 20110074697; 20110074696; 20110074695; 20110074694; 20110074677; 20110072394; 20110072375; 20110069017; 20110069016; 20110063224; 20110055317; 20110010672; 20110010626; 20110001706; 20100313157; 20100313125; 20100309155; 20100309154; 20100309149; 20100309148; 20100309147; 20100293462; 20100289754; 20100283747; 20100273139; 20100235794; 20100235793; 20100235785; 20100235784; 20100235783; 20100235778; 20100235770; 20100235746; 20100235735; 20100235734; 20100235729; 20100235726; 20100235118; 20100231612; 20100231537; 20100231536; 20100231535; 20100231534; 20100231533; 20100231506; 20100229090; 20100171712; 20100130280; 20100125811; 20100125785; 20100123724; 20100110932; 20100097342; 20100097329; 20100097328; 20100095234; 20100090971; 20100088595; 20100079405; 20100060586; 20100045705; 20100045633; 20100045629; 20100045628; 20100037273; 20090327976; 20090322688; 20090307633; 20090303231; 20090289911; 20090278816; 20090273571; 20090256817; 20090228825; 20090228807; 20090228792; 20090219256; 20090178008; 20090178007; 20090177981; 20090174680; 20090167700; 20090100129; 20090077488; 20090073194; 20090070705; 20090070704; 20090066728; 20090058830; 20090044988; 20090007017; 20090006644; 20090006570; 20090005011; 20080320419; 20080320391; 20080231610; 20080222545; 20080220752; 20080218535; 20080211785; 20080211784; 20080211783; 20080211778; 20080211775; 20080211766; 20080204426; 20080201650; 20080180408; 20080174570; 20080168405; 20080168404; 20080168396; 20080168395; 20080168379; 20080168365; 20080168361; 20080168353; 20080168349; 20080167834; 20080165160; 20080165153; 20080165152; 20080165151; 20080165149; 20080165148; 20080165147; 20080165146; 20080165145; 20080165144; 20080165143; 20080165142; 20080165136; 20080165022; 20080122796; 20080098331; 20080094371; 20080094370; 20080094369; 20080094368; 20080094356; 20080082934; 20080082930; 20080074400; 20080057926; 20080055273; 20080055272; 20080055269; 20080055264; 20080055263; 20080052945; 20060197752; 20060197750; 20060125803; 20060026536; 20060026535; 20060026521; and 20030174125, each of which is expressly incorporated herein by reference.

In addition to the described techniques, the system may be made more robust by modeling illumination patterns, and processing the images to with respect to the illumination patterns, on one hand, or normalizing the illumination pattern to make the subsequent processing generally illumination invariant. Another embodiment provides structured lighting, in order to permit direct exploitation of the illumination pattern in determining hand gestures. Another embodiment provides semistructured lighting, such as different color light from different directions, to create distinct parallax shadows and facilitate surface estimation.

According to a still further embodiment, the images are processed globally.

The present system and method also provides a model for pointing cursor determination on a screen, and evaluating the pointing direction and its error by measuring the difference between the projected positions and the expected positions on the screen. Other types of feedback may also be used to correct the algorithm and/or the output of the system.

While a preferred embodiment employs traditional 2D image sensors, 3D hand models can be captured using a 3D imaging system, such as a stereoscopic camera, structured lighting image acquisition system, such as the Microsoft Kinect or Kinect V2 (Primesense), or the like; however, a higher resolution image acquisition system (e.g., 1080P) is typically preferred for accuracy and reliability.

While one embodiment describes two orthogonal cameras, other implementations are possible. For example, a larger number of cameras, and/or cameras with different relative orientations with respect to the hand may be provided. Further, a stream of images from one or more cameras may be provided to permit processing of hand movements over time, potentially permitting use of a single imager.

In order to generate the working image, the background of the image is first eliminated, using for example the following color channel arithmetic:

$$I(x,y)=R(x,y)-\text{Max}\{G(x,y),B(x,y)\}$$

A preferred process includes a hand image warping step. The hand-wrist junction may be estimated based on the strong correlation of skin colors between hand and wrist. In particular, the average color of the block containing the wrist is the most similar to the average color of the central block among the 8 surrounding blocks. In some cases, lighting may be controlled to accentuate this difference. Likewise, in some cases, a camera with infrared sensitivity may be employed to provide hyperspectral imaging.

In the hand image warping, the image is warped from a Cartesian to Polar space. After this warping or transformation, a binary pattern-based hand detection algorithm may be employed, for example, based on Viola-Jones' approach, using Haar-Like patterns applied to the warped image. In this process, an integral image is generated, and then Haar-like features generated using binary patterns, e.g., as shown in FIG. 2A. A cascade detector is built using AdaBoost, and an Active Appearance Model (AAM) applied. A static model may be created for each view. According to a preferred embodiment, 14 landmarks are chosen and employed for each model. The AAM may in some cases be developed based on generic human anatomy, however, development of the AAM for a particular user is preferred.

A top and side camera may be used to acquire the images, with the top view was used as (x, z) coordinates, and side view was used as (z, y) coordinates. The average of both z values may be taken to be the estimated z coordinate. Alternately, if one of the side to top cameras is known to present a better estimate of z than the average, that one camera (or some other weighed combination of the images) employed. The pointing vector was created by connecting 2 reliable landmark points on the index finger by a line.

The complex nature of the range of colors which constitute skin tones make it difficult to establish a firm set of values for image segmentation, and many types of methods for handling skin detection have been proposed. Variations in lighting further complicate the process of distinguishing skin from background colors. For these reasons, it is desirable to use machine learning approaches to establish a classifier which could accurately classify known examples of each class as well as provide reasonable guesses for colors not found in the training data.

A Bayesian classifier provides a simple, robust classification with a built-in classification confidence and can be used if a probability distribution function (PDF) can be established for each class. Since the actual PDF for the skin and background classes is not known, it is necessary to design an approximation of the PDF based on known data.

A Gaussian Mixture Model (GMM) provides such an approximation. Therefore, the basis for hand detection is a Gaussian Mixture Model (GMM) based classifier for distinguishing skin colored pixels from background pixels. This is combined with a connected component analysis system in order to locate blocks of the image which contain significant amounts of skin colored pixels.

A skin tone pixel segmentation algorithm may use a single Bayesian classifier based on the GMMs determined from a static set of training data. The classifier is fully computed ahead of time by a training program which processes a set of example images to extract the user-specified color components and train the GMMs accordingly. Once the training program has completed, the classifier remains fixed, and can be used for a separate hand detection application. The features that were used by the classifier were taken from the YIQ color space. Like the HSV color space, YIQ consists of one component (Y) which corresponds to overall brightness, while the other two components (IQ) provide the color. By discarding the brightness component from the YIQ data, a certain degree of lighting invariance was gained.

To fit the specifications of a GMM to a set of data, a fixed number of Gaussians for the GMM were established, and then fit each of the Gaussians using the classic Expectation-Maximization (EM) algorithm. In order to locate potential hand regions in images, the system may first use a Bayesian classifier to identify skin tone areas. While every pixel of the image maybe processed by the classifier. Preferably, the hand detector may divide the image into a grid of blocks which are 8×8 pixels in size. The feature values of the pixels within each block are averaged, and these mean values are fed into the classifier. The resulting classification is then applied to all pixels within the block. The size of the block was empirically selected based on the criteria that it would sufficiently reduce processing time and that it would evenly divide common image sizes.

Once the Bayesian classifier has identified each block as either skin or background (essentially producing a downscaled classification image), the results are scanned for connected regions consisting of blocks with a skin confidence of at least 50%. A skin-pixel based region-growing approach may be applied to detect the connected components of skin-regions. Connected regions whose width or height is below an empirically derived threshold are assumed to be false positives and are discarded. Any remaining connected regions are presumed to be hands.

Since the two views of hands are tracked separately with different models, we are able to create the best fit for the corresponding hand in each frame. There is correspondence between multiple landmarks in the separate views. Those landmarks, most notably on the finger, allow us to infer the 3D coordinates from 2D coordinates, and infer the 3D orientation of the finger. For one point that has correspondence between the two models, we can use the top view as the (x, z) coordinate and the side view as the (z, y) coordinate. We can then combine both of the views to infer the (x, y, z) coordinate for that tracked landmark. We use the z coordinate from the top view.

Once we have the 3D coordinates of the tracked points we take two points on the finger that are "connected by a line" to create a vector that points in the direction of the finger. The two points selected are near the top and bottom of the pointing finger. These were selected as they appear to give us the most reliable vector in determining the orientation of the finger.

Since cursor movement even with a mouse is all relative (rather than absolute) motion, we normalize the pointing vector and map the x and y components directly onto the screen. When the AAM first initializes, we record the starting z position of the hand from the top view; if the user moves his/her hand forward by a certain distance from that starting z position, we may interpret this as a mouse click.

It is therefore an object to provide a method for estimating a finger pointing direction using an active appearance model, which tracks a plurality of landmarks on the hand, corresponding to landmarks of hands in a training image set to which a principal component analysis is applied to formulate a statistical model of the hand, comprising: detecting a hand in each of at least two images acquired from different angles, locating a center of the hand and a position of the wrist in each image; warping the detected hand in each image from a Cartesian Coordinate representation to a Polar Coordinate representation, with the center of the hand at the pole, and the polar angle determined by a position of the wrist with respect to the center of the hand; applying the active appearance model to find a best fit for visible landmarks of the hand in each image; combining the best fit for the visible landmarks of the hand in each image to the active appearance model to infer a three dimensional position of each visible landmark in each image; determining at least two visible features of a finger extending from the hand, to define a pointing gesture in each image; and determining at least one of a three dimensional pointing vector of the finger and a target of the pointing gesture.

It is a further object to provide a method for estimating a finger pointing direction using an active appearance model, which tracks a plurality of landmarks on the hand, corresponding to landmarks of hands in a training image set to which a principal component analysis is applied to formulate a statistical model of the hand, comprising: capturing at least two images of a hand from different directions; detecting the hand in each image and locating a center of the hand; determining a position of the wrist in each image; warping the detected hand in each image from a Cartesian Coordinate representation to a Polar Coordinate representation, with the center of the hand at the pole, and the polar angle determined by a position of the wrist with respect to the center of the hand; applying the active appearance model to find a best fit for the hand in each image; combining the fit of the hand in each image to the active appearance model to infer a three dimensional position of each visible point in an image; determining two points at different distances along a finger extending from the hand, to define a pointing vector in the at least two images, wherein the two points are selected based on a reliability of the resulting vector; and determining a three dimensional pointing vector of the finger.

It is a still further object to provide an apparatus for estimating a finger pointing direction, comprising: a memory configured to store parameters of an active appearance model of a hand, which includes a plurality of landmarks on the hand, corresponding to landmarks of hands in a training image set to which a principal component analysis is applied; an input configured to receive at least two images acquired from different angles; at least one processor configured to receive the input, access the memory, and produce an output based on the at least two images and the parameters in the memory; and an output port, communicating data responsive to a finger pointing direction of the hand, wherein the at least one processor is further configured to: detect a hand in each of the at least two images acquired from different angles, locating a center of the hand and a position of the wrist in each image; warp the detected hand in each image from a Cartesian Coordinate representation to a Polar Coordinate representation, with the center of the hand at the pole, and the polar angle determined by a position of the wrist with respect to the center of the hand; apply the active appearance model, based on the parameters in the memory, to find a best fit for visible landmarks of the hand in each image; combine the best fit for the visible landmarks of the hand in each image to the active appearance model to infer a three dimensional position of each visible landmark in each image; determine at least two visible features of a finger extending from the hand, to define a pointing gesture in each image; and determine a pointing direction comprising at least one of a three dimensional pointing vector of the finger and a target of the pointing gesture.

The detecting the hand may comprises generating Haar-like features from the at least two images, and implementing a cascade detector using AdaBoost, wherein portions of each image are scanned over different translations, scales and rotations to find a best fit for the hand.

The at least two images may be color images, and color sensitive image processing may be employed to distinguish the hand from a background. Likewise, the at least two images may be color images, and color sensitive image processing may be employed to define a wrist location as a location on the hand having a most similar surrounding color consistent with skin tones.

The at least two visible features of the finger may be selected based on a reliability of a resulting three dimensional pointing vector.

The system and method may provide a user feedback display of a target of the pointing gesture and/or a target along the three dimensional pointing vector of the finger.

The determining at least one of the three dimensional pointing vector of the finger and the target of the pointing gesture may represent a statistical averaging over time derived from the pointing gesture in each image. The determined three dimensional pointing vector of the finger may represent a statistical averaging over time.

The best fit for visible landmarks of the hand in each image, or the best fit for the hand in each image, to the active appearance model may be updated for respective sequences of the at least two images, to track a movement of the hand.

The at least two images may comprise at least two video signals, each representing a time sequence of images.

BRIEF DESCRIPTION OF THE DRAWINGS

FIGS. 2A and 2B show a block diagram of hand region detection training and detection algorithms for a pair of views;

FIGS. 3A, 3B and 3C illustrate a first example of a raw image, a processed image, and a hand image divided into 3×3 blocks, respectively;

DETAILED DESCRIPTION OF THE PREFERRED EMBODIMENTS

In a preferred embodiment, two regular cameras are set up in orthogonal positions, one on the top of the user, and the other to the left side.

Figures 1A, 1B:
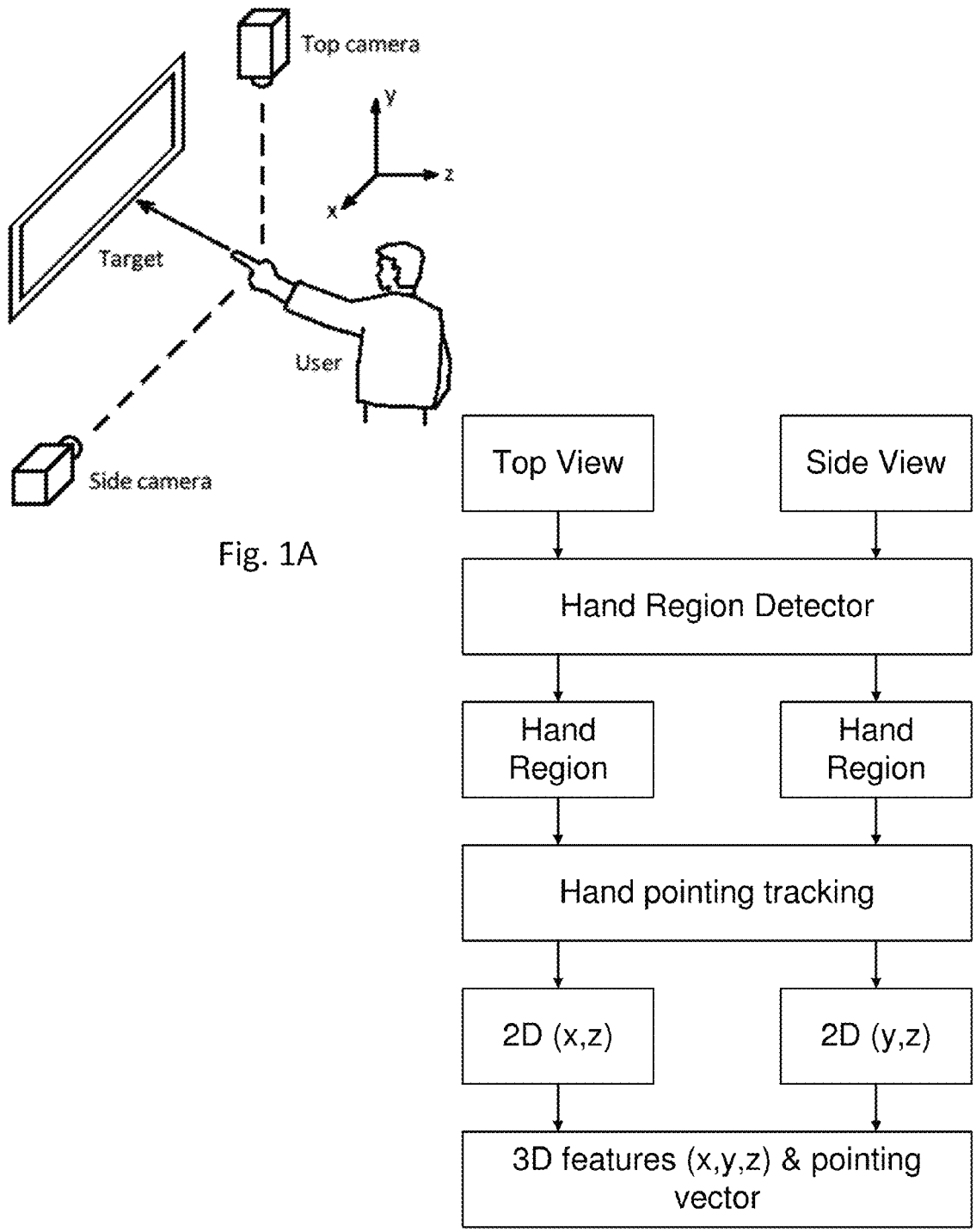
FIGS. 1A and 1B show a schematic and block diagram of major components of a preferred embodiment of the invention.

FIGS. 1A and 1B show the major components of the system. Unlike binary-pattern based approaches [5, 10] which are limited to a certain degree of hand rotation, a hand-image warping approach is preferably provided to transform the original hand image to a polar-coordinate plane in order to make the hand detection invariant to orientation.

According to a preferred embodiment, two cascade detectors are applied based on binary pattern features and AdaBoost [15] for two views' hand region detection. Then, the Active Appearance Model (AAM) [3] is used to track the finger points to identify the direction of hand pointing. While AAM is more commonly used for face tracking, as employed herein it is extended to track landmark features of hands. The 3D orientation of a pointing finger in 2D space may then be inferred. This is done via two simultaneous or nearly simultaneous image captures of the hand, for example from two video steams with small time misalignment. The two imagers capture images of an overlapping region, in which the hand is visible. There is thus correspondence between the points in the top and side views. Using this correspondence between the points allows inference of the (x, y, z) coordinates of those points. Once the 3D coordinates are obtained, two points along the finger are used to draw a vector in 3D space, resulting in a determination of the orientation of the finger.

Hand region detection is the first step in estimating the pointing direction. FIGS. 2A and 2B show the diagram of the training algorithm and hand region detection algorithm for both views. Motivated by the success of face detection developed by Viola-Jones [15] using Haar-like features and an AdaBoost cascade detector, the corresponding features are extended to hand regions detection for the pointing gesture. The binary patterns used in [15] describe the features within facial regions with no background involved. However, the most significant features of a hand pointing gesture are the shape of the hand rather than internal hand shades and textures. As features to describe the shape of the hand pointing are desired, the visible edge and background are involved. Unfortunately, various backgrounds may cause instability for hand detection. A simple approach to solving this issue uses color channel arithmetic to reduce the influence of different types of backgrounds. By observing that the skin color has much stronger red component than the green and blue components, the image is computed by $$I(x,y)=R(x,y)-\text{Max}\{G(x,y),B(x,y)\} \quad (1)$$

This simple process can roughly highlight the skin area. As a result, a working image I is generated, based on which subsequent operations using the binary pattern approach can be carried out effectively.

FIGS. 3A, 3B, 3C, 4A, 4B, and 4C show two examples of a captured image, processed image and a 3×3 decomposition of the hand, respectively.

Figure 5:
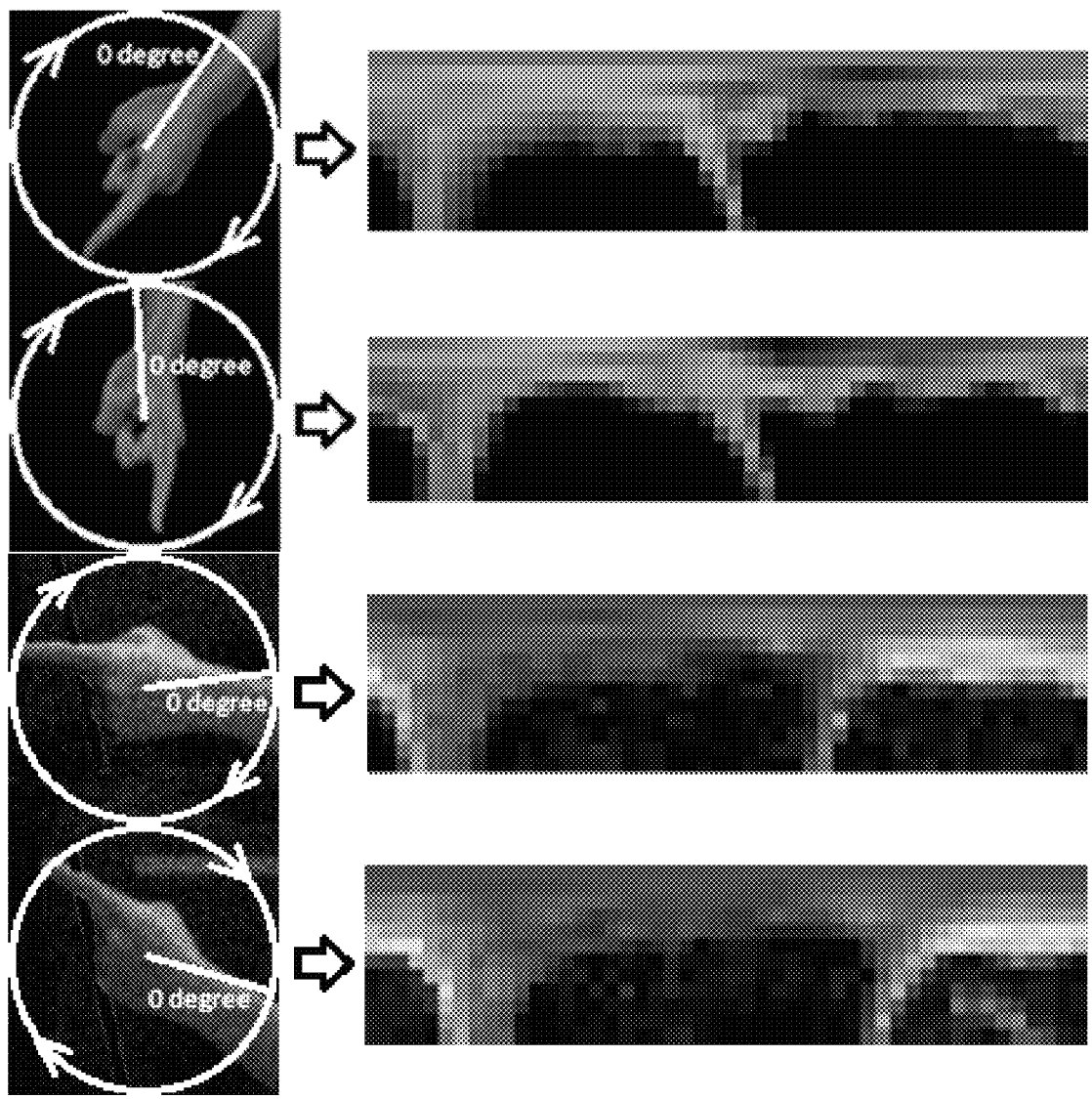
FIG. 5 shows examples of image warping from two views.

Some existing work has applied pre-designed binary patterns for hand detection successfully [5, 10]. However, the detection is still sensitive to the variation of hand orientations. The report in [5] shows that only 15° of hand rotation can be detected by applying the Viola-Jones-like approach [15], resulting in a significant limitation. To improve the orientation invariance to hand region detection, the present technology warps the hand image from Cartesian coordinates to polar-radial coordinates. To do so, the center of the window is used as a pole ("0"), and the polar angle (θ) at 0 degrees is determined by the position of the wrist, as shown in FIG. 5. The radius (r) of the polar axis is determined by the window size.

Figures 4A, 4B:
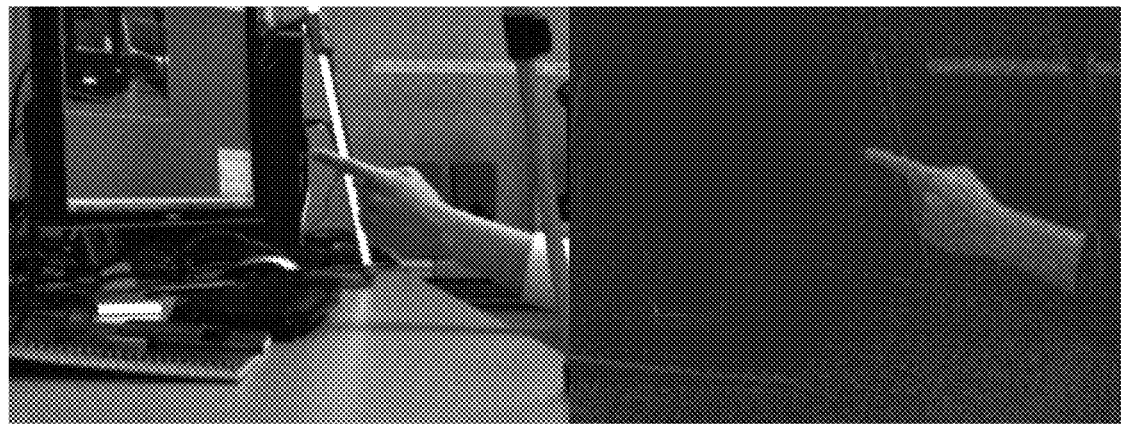
FIGS. 4A, 4B and 4C illustrate a second example of a raw image, a processed image, and a hand image divided into 3×3 blocks, respectively.
Figure 4C:
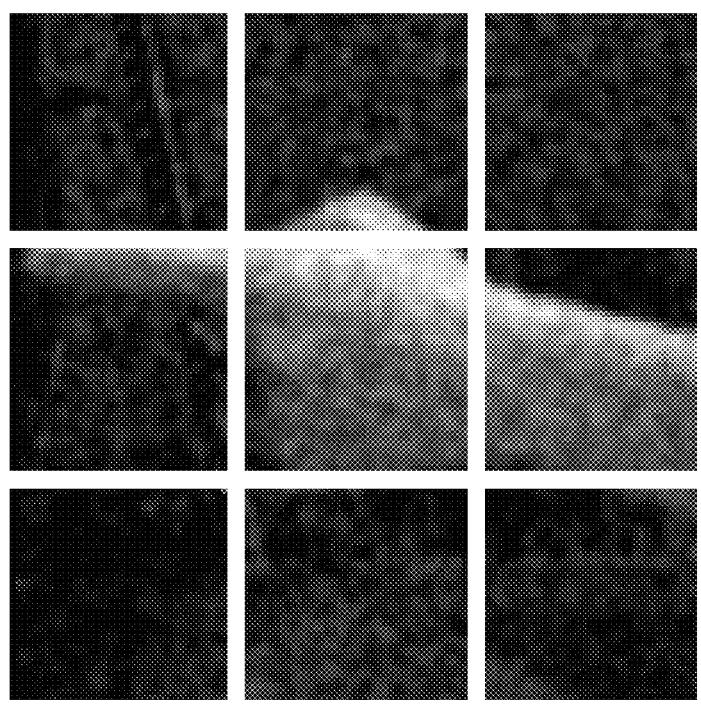

Since a hand is always connected with its corresponding wrist, in order to estimate the wrist position, 27×27 hand image is divided into 3×3 blocks as shown in FIGS. 3C and 4C. In these figures, the first is contained in the central block, and the wrist is located at one of the surrounding 8 blocks. Due to the strong correlation of skin colors between hand and wrist, the average color of the block containing the wrist is the most similar to the average color of the central block among the 8 surrounding blocks. The position of the wrist is identified by comparing the average color of the 8 blocks and the central block.

After the position of the wrist is determined, this position is used as the 0 degree polar coordinate, and the image converted from Cartesian (x, y) to Polar coordinates (θ, r).

FIG. 5 shows examples of the image warping from both views. As seen, the converted images have similar appearances regardless of hand orientations rotated in the image plane.

After the image conversion, the binary patterns are applied as shown in FIG. 2A (four black-white patterns) to the warped image in (θ, r) coordinates.

Figure 6:
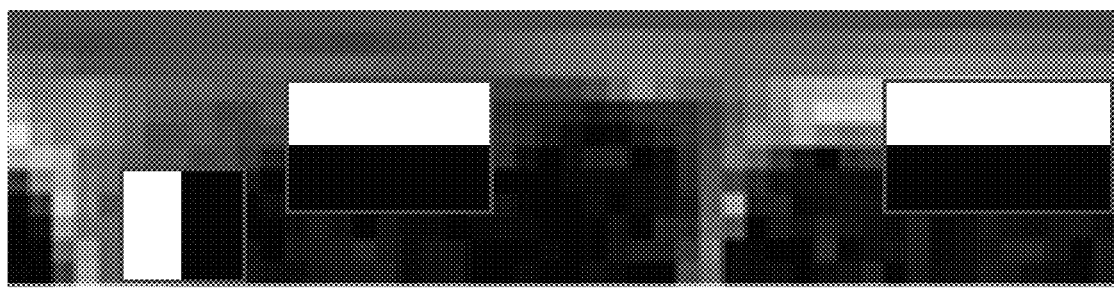
FIG. 6 illustrates an example of binary patterns overlapping on the warped image.

FIG. 6 illustrates an example of the binary patterns overlapping on the warped image.

Similar to the procedure used in [15], the present hand detector performs the following three operations:

(1) integral image generation,
(2) Haar-like features generation using the above binary patterns, and
(3) building cascade detector using AdaBoost.

After the detector has been built (based on the training inputs), it scans the input image in a brute-force way. All sub-windows with different size and position in the image will be input to the detector. Once a sub-window has passed the detector, it will be marked as a candidate. This searching can be performed in parallel, and results of calculations for any one block reused or exploited for calculations required for any different scale, translation, or rotation.

The processor employed may be a traditional single or multithreaded processor, an application specific processor, a CPLD, an SIMD processor (e.g., GPU-type processor), or other known type. In many cases, a single or multicore main processor may assume the processing tasks required for determining hand gestures, as part of the user interface processing. In other cases, a coprocessor, special purpose processor, or remote processing capability (e.g., cloud computing or distributed processing) may be provided. For example, in a power-constrained system, it may be more efficient to offload the main operating system processor from assuming the entirety of the hand gesture recognition tasks, and permit another available resource or resources to implement the function. In some cases, the off-loading may be optional or in parallel. For example, in a cell-phone or tablet, the image streams may be communicated to a WiFi router or cell site for processing of the algorithm.

A particular advantage of delegation or distribution of the human user interface input processing from the main computational processor for the system driven by the interface, is that the computational load, other than the user interface, may be relatively low while the system awaits user inputs. On the other hand, aspects of the hand or other gesture recognition may be more efficiently processed outside of the main computational processor, or the load on the main computational processor from the gesture recognition may be sufficient that significantly greater capacity is achieved by offloading. Further, it is noted that the gesture recognition aspect generally requires a camera, and therefore at least a portion of the system and method may be implement at, or in conjunction with the camera. This, in turn, permits a processed stream of user interface input information having a relatively low data rate to be presented to the operating system or application program, rather than the raw video data from one or more cameras.

Given the detected hand regions, hand features are tracked in the limited search regions. An Active appearance model (AAM) [3] is applied to track 14 pre-defined feature hand-points on both top view and side view. AAM is a method of matching statistical models to images developed by Cootes et al. [3]. A set of landmark images are used to create the training set. The model parameters that control the shape and gray-level variation are subsequently learned from this training set.

The landmarks selected for the training set represent the shape of the object to be modeled. These landmarks are represented as a vector and principal component analysis is applied to them. This can be approximated with the following formulas:

$$x=\bar{x}+P_s b_s \text{ for shape and } g=\bar{g}+P_g b_g \text{ for texture.}$$

In the shape formula $\bar{x}$ is the mean shape. $P_s$ represents the modes of variation and $b_s$ defines the shape parameters. In the texture formula $\bar{g}$ is the mean gray level. $P_g$ represents the modes of variation and $b_g$ defines the grey-level parameters.

AAMs are used to create a statistical model of the hand from two orthogonal views via a simultaneous capture. A separate appearance model is created for each view, and the hand tracked in two views separately. To create the hand shape and gray-level models 14 landmarks were chosen for the training set images.

Figure 7:
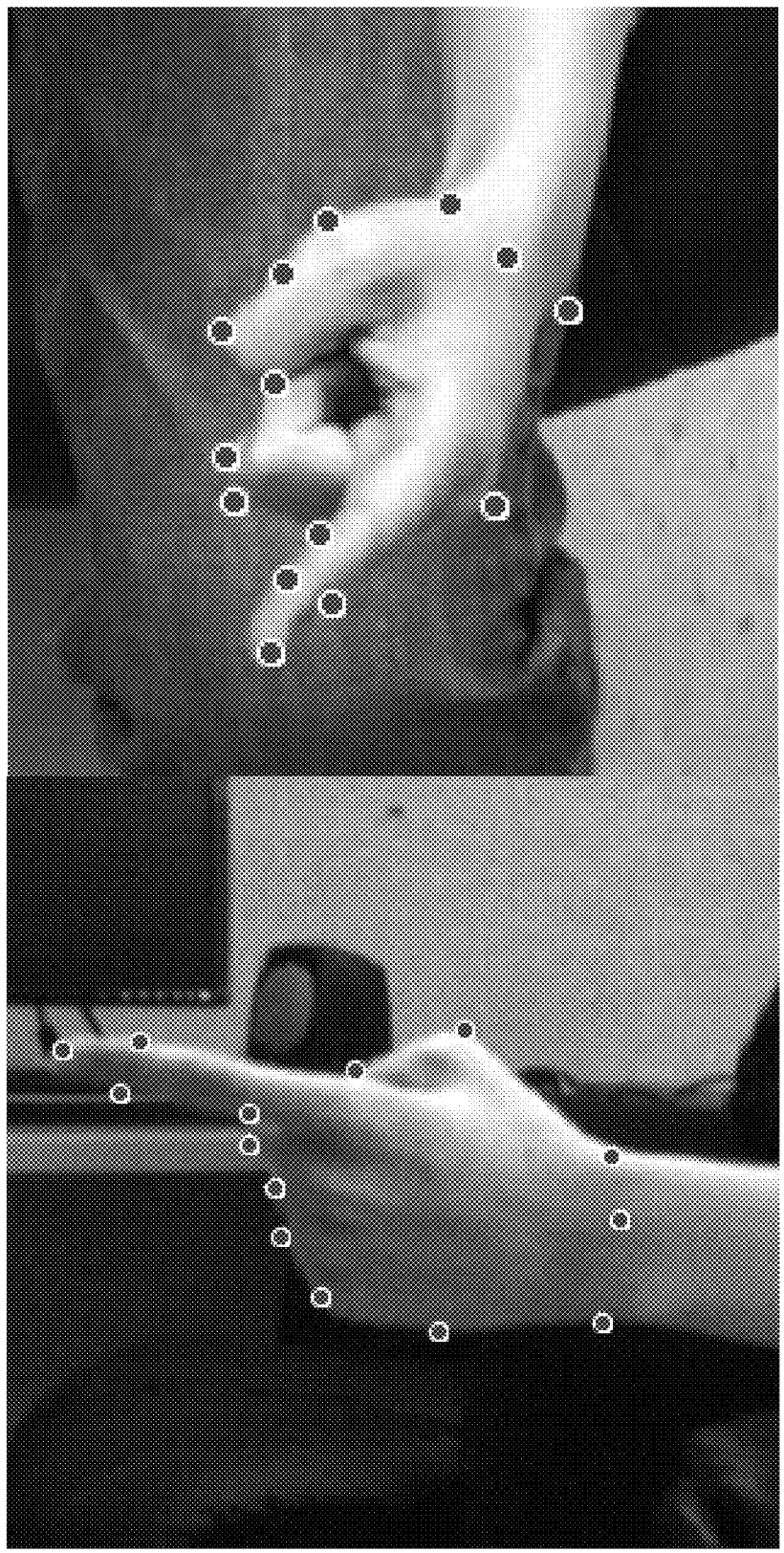
FIG. 7 shows landmarks for the top and side views of a hand image.

These landmarks for the top and side views can be seen in FIG. 7. Note that the hand detection of the previous stage allows us to narrow down the search region for fitting our model to the hand, thus reducing the time for finding a correct fit.

Since the two views of hands are tracked separately with different models, the best fit for the corresponding hand is created for each frame. There is correspondence between multiple landmarks in the separate views. Those landmarks, most notably on the finger, allow inference of the 3D coordinates from 2D coordinates, and inference of the 3D orientation of the finger.

For one point that has correspondence between the two models, the top view can be used as the (x, z) coordinate and the side view as the (z, y) coordinate.

Both of the views may be combined to infer the (x, y, z) coordinate for that tracked landmark. Since the z coordinate may not be the same in both of the views, both values are averaged to give us a new z coordinate.

Figure 9:
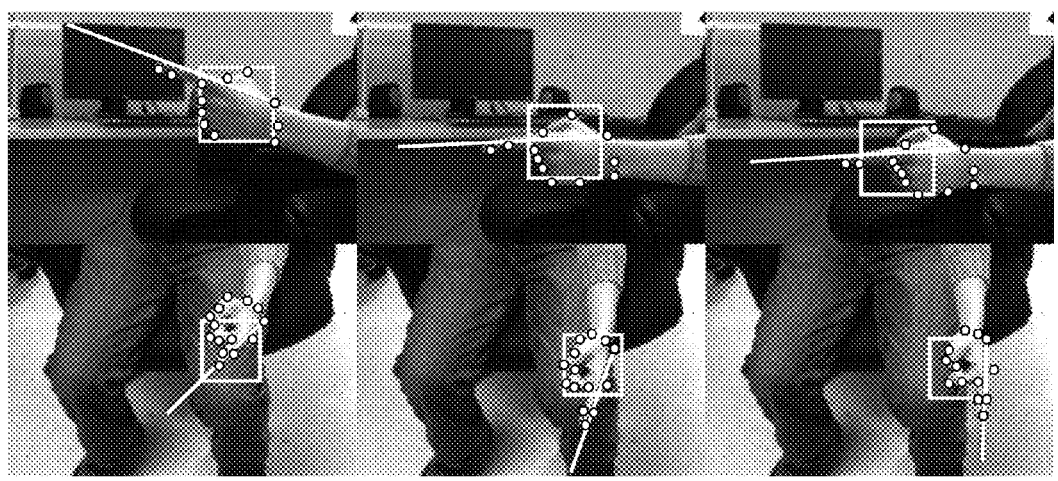
FIG. 9 shows an example of the estimated pointing vectors along with the detected hand regions and the tracked 14 feature points.

Once the 3D coordinates of the tracked points are obtained, two points on the finger that are "connected by a line" are selected to create a vector that points in the direction of the finger. The two points selected are near the top and bottom of the pointing finger. These were selected, for example, as they appear to give the most reliable vector in determining the orientation of the finger. The other landmarks are used to create a better fit for the AAM search, as well as for future modeling of hand details. This vector is shown in FIG. 9 via the line pointing from the finger.

Figure 8:
FIG. 8 shows examples of training images.

The system may be set up with two regular cameras (i.e., color video cameras), one being a top view and the other a side view. A preferred embodiment of the system works with a resolution of 640×480. To train two detectors for two views separately, 107 positive image samples and 160 negative samples were selected for the top view of hands, and 128 positive samples and 145 negative samples selected for the side view. FIG. 8 shows examples of training images.

It is noted that the video cameras may have associated illuminators, which may emit visible or infrared light. In the case of infrared light, the system should be calibrated for the reflective characteristics of human skin under such illumination. Structured illumination may also be employed, though it is typically not necessary.

In the training stage, the binary patterns were applied to the converted image in the polar coordinate system, and over 5,000 features generated for each sample.

Then, two views cascade detectors are built based on the feature selection by AdaBoost. In the testing stage, after the input image is converted to the working image, each detector scans the working image in each view separately. Note that during the hand region search, the integral image is computed locally on the warped image in the polar coordinate system. The experiments are conducted in our lab environment. The hand motion is in the range of [−60°, +60°] for both pan and tilt.

FIG. 9 shows an example of the estimated pointing vectors (line) along with the detected hand regions (box) and the tracked 14 feature points (dots).

Table 1 shows the degrees of rotation of the finger pointing in FIG. 9 and their corresponding normal vectors n.

TABLE 1

| Degrees of rotation for vectors in FIG. 9 | | | |
|---|---|---|---|
| Tilt (upper row) | 20.6° | −2.57° | −3.81° |
| Pan (lower row) | −45.81° | −18.94° | −1.42° |
| $\vec{n} = (\vec{x}, \vec{y}, \vec{z})$ | (−0.58, 0.20, −0.56) | (−0.23, −0.03, −0.67) | (−0.02, −0.06, −0.99) |

Comparing the detected hand regions with the manual selected ones, 90% and 91% correct detection rate was achieved for the top-view (691 images) and side view (829 images), respectively. In addition, the estimated hand pointing orientations are also compared to the physically measured hand orientation during the time of capture. Among 7,600 frames, 6,916 frames show less than 5-degree difference between two data sets. The correct pointing rate is 91%.

Hardware Overview

According to a preferred embodiment, the gaze direction determination system executes on a Microsoft Windows® system, using Windows XP, Vista or Windows 7 (64-bit), having an Intel Core-2 Duo (2.0 GHz) equivalent or greater CPU, greater than 2 GB RAM, an NVIDIA graphics card supporting CUDA 3.1.9 or greater, at least 300 MB free hard disk, and a USB webcam.

Figure 10:
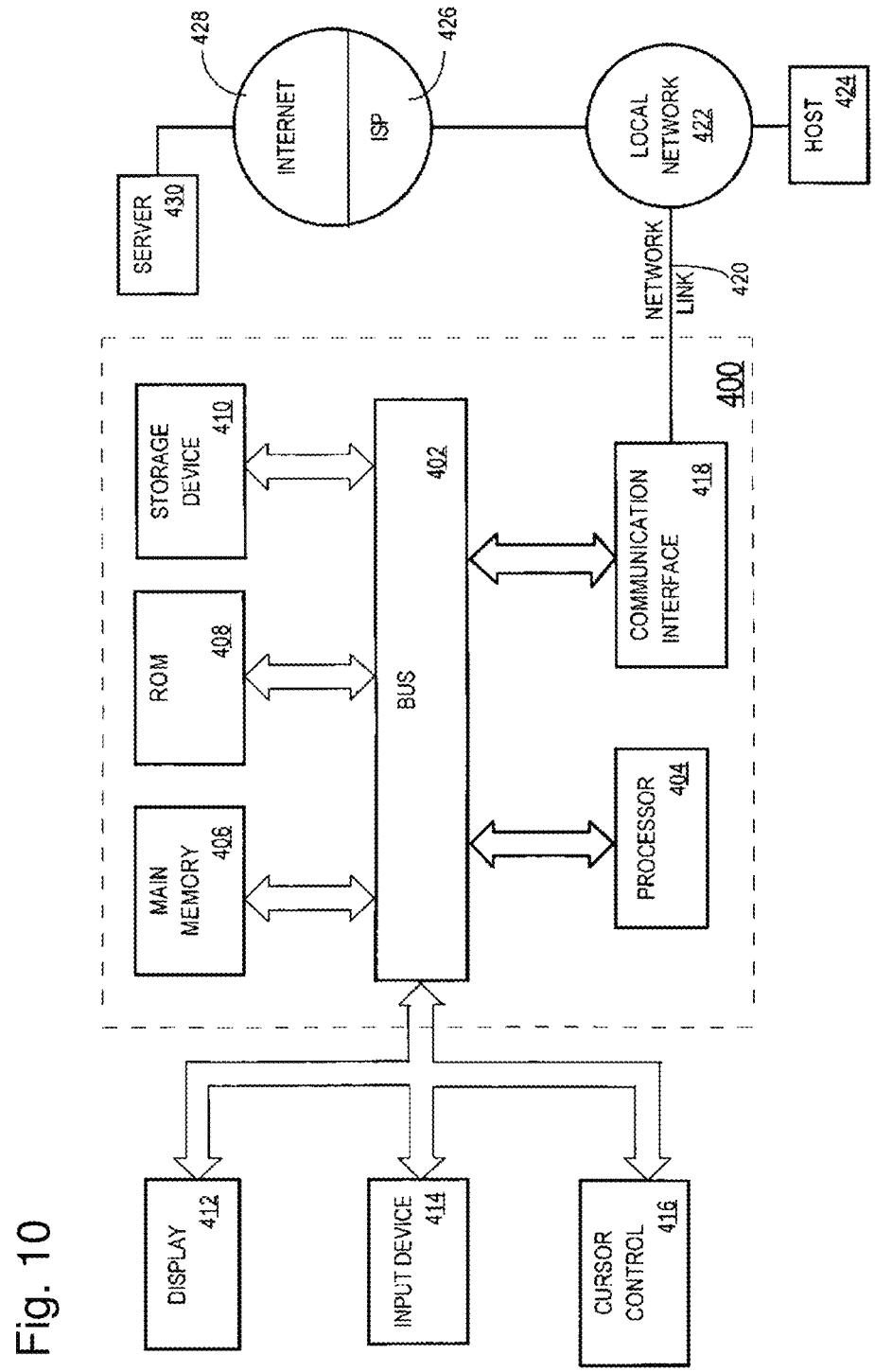
FIG. 10 shows an exemplary hardware system according to the prior art.

FIG. 10 (see U.S. Pat. No. 7,702,660, expressly incorporated herein by reference), shows a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

As discussed above, the present technology provides an alternate or supplemental user input system and method, which may advantageously be used in conjunction with other user interface functions which employ the same camera or cameras.

The technology is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions for implementation. Thus, embodiments of are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, semiconductor devices, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine. Wireless or wired communications, using digitally modulated electromagnetic waves are preferred.

Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, a carrier wave as described hereinafter, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using a wireless Ethernet protocol (e.g., IEEE-802.11n) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

U.S. 2012/0173732, expressly incorporated herein by reference, discloses various embodiments of computer systems, the elements of which may be combined or subcombined according to the various permutations.

In this description, several preferred embodiments were discussed. It is understood that this broad invention is not limited to the embodiments discussed herein, but rather is composed of the various combinations, subcombinations and permutations thereof of the elements disclosed herein. The invention is limited only by the following claims.

REFERENCES

Each of which is Expressly Incorporated Herein by Reference

[1] L. Clinque, et al, Fast viewpoint-invariant articulated hand detection combining curve and graph matching, *IEEE FGR* 2008.

[2] C. Colombo et al., Visual capture and understanding of hand pointing actions in a 3-D environment, *IEEE Trans. on SMC-B* 33(4), 2003. pp. 677-686.

[3] T. Cootes, G. Edwards, and C. Taylor. Active appearance models. *IEEE PAMI*, 23(6): 681-685, 2001.

[4] N. Jojic et al, Detection and estimation of pointing gestures in real-time stereo sequences, In *IEEE FGR '00*.

[5] M. Kölsch and M. Turk. Analysis of rotational robustness of hand detection with a viola-jones detector. *ICPR* 2004.

[6] I. Fratric and S. Ribaric, Real-time model based hand localization for unsupervised palmar image acquisition, Proc. ICB 2009.

[7] M. Lee, D. Weinshall, et al. A computer vision system for on-screen item selection, *IEEE CVPR* 2001.

[8] C. Manders, F. Farbiz, et al. Robust hand tracking using a skin tone and depth joint probability model. *FGR*, 2008.

[9] T. Moeslund and E. Granum, A survey of computer vision-based human motion capture, *CVIU* 81(3), 2001.

[10] T. Nguyen, N. Binh, and H. Bischof. An active boosting-based learning framework for real-time hand detection. *IEEE FGR*, 2008.

[11] K. Oka, Y. Sato, and H. Koike, Real-time fingertip tracking and gesture recognition, *IEEE Computer Graphics and Applications*, 2002.

[12] C. Park, M. Roh, and S. Lee, real-time 3D pointing gesture recognition in mobile space, *IEEE FGR* 2008.

[13] V. Pavlovic and T. Huang, et al, Visual interpretation of hand gestures for HCI: review, *IEEE Trans. PAMI*, 1997.

[14] A. Utsumiy, et al, Hand detection and tracking using pixel value distribution model for multiple-camera-based gesture interactions. *IEEE CVPR*, 2001.

[15] P. Viola and M. Jones. Robust real-time face detection, *International J. of Computer Vision* 57(2)137-154, 2004.

[16] R. Wang and J. Popovic, Real-time hand-tracking with a color glove, *SIGGRAPH* 2009.

[17] Y. Wu and T. Huang, Vision-based gesture recognition: A review, In *IEEE 3rd Gesture Workshop*, 1999.

[18] Y. Yamamoto et al, Arm-pointing gesture interface using surrounded stereo cameras system, In *ICPR* 2004.

[19] B. Stenger, A Thayananthan, P. Torr, and R. Cipolla, Model-based hand tracking using a hierarchical Bayesian filter, IEEE Trans. PAMI, 28(9): 1372-1384, 2006.

[20] T. R. Kaminski et al., "The coordination Between Trunk and Arm Motion During Pointing Movements", Exp Brain Res (1995) 106:457-466.

[21] P. Rulić, et al., "Hand pointing detection system for tabletop visual human-machine interaction", vicos.fri.uni-lj.si/data/publications/rulicERK08.pdf (2008).

[21] Y. Wu, et al., "View-independent Recognition of Hand Postures", In Proc. of IEEE Conf. on CVPR'2000, Vol. II, pp. 88-94, Hilton Head Island, S.C. (2000).

[22] J. F. Soechting et al., "Invariant Characteristics Of A Pointing Movement In Man", J. Neuroscience 1(7):710-720 (1981).

[23] J. Richarz, et al., "There You Go!—Estimating Pointing Gestures In Monocular Images For Mobile Robot Instruction", The 15th IEEE International Symposium on Robot and Human Interactive Communication (RO-MAN06), Hatfield, UK, Sep. 6-8, 2006.

[24] Teófilo E. de Campos et al., "Directing the Attention of a Wearable Camera by Pointing Gestures", IEEE Brazilian Symposium on Computer Graphics and Image Processing (SIBGRAPI) (2006).

[25] Björn Dietmar Rafael Stenger, "Model-Based Hand Tracking Using A Hierarchical Bayesian Filter", Ph.D. Thesis, University of Cambridge 2004).

[26] Edwards G, Taylor C, Cootes T. Interpreting face images using active appearance models Proceeding of the International Conference on Face And Gesture Recognition 1998, pages 300-305.

[27] T. F. Cootes, C. J. Taylor, D. H. Cooper, and J. Graham. Training models of shape from sets of examples. In Proceedings of BMVC'92, pages 266-275, 1992.

[28] S. C. Mitchell, J. G. Bosch, B. P. F. Lelieveldt, R. J. van der Geest, J. H. C. Reiber, and M. Sonka. 3-d active appearance models: Segmentation of cardiac MR and ultrasound images. IEEE Trans. Med. Imaging, 21(9):1167-1178, 2002.

[29] T. F. Cootes, G. J. Edwards, and C. J. Taylor. Active appearance models. ECCV, 2:484-498, 1998.

[30] T. F. Cootes, M. Ionita, C. Lindner and P. Sauer, "Robust and Accurate Shape Model Fitting using Random Forest Regression Voting", ECCV 2012.

[31] A. Caunce, C. J. Taylor and T. F. Cootes, "Using Detailed Independent 3D Sub-Models to Improve Facial Feature Localisation and Pose Estimation" ISVC 2012.

[32] M. Ionita, P. Tresadern and T. Cootes "Real Time Feature Point Tracking with Automatic Model Selection", International Workshop on Human-Computer Interaction, IEEE ICCV Workshops, pp. 453-460, 2011

[33] P. Sauer, T. Cootes, C. Taylor "Accurate Regression Procedures for Active Appearance Models", BMVC 2011

[34] A. Caunce, T. F. Cootes and C. J. Taylor, "Adding Facial Actions into a {3D} Model Search to Analyse Behaviour in an Unconstrained Environment", International Symposium on Visual Computing 2010, pp. 132-142

[35] T. F. Cootes, "Deformable Object Modelling and Matching", Proc ACCV2010

[36] P. Zhang and T. F. Cootes, "Automatic Learning Sparse Correspondences for Initialising Groupwise Registration", Proc. MICCAI 2010, Vol. 2, pp. 635-42

[37] A. Caunce, T. F. Cootes and C. J. Taylor, "Improved 3D Model Search for Facial Feature Location and Pose Estimation in 2D images", Proc. British Machine Vision Conference 2010

[38] P. Tresadern, P. Sauer and T. F. Cootes, "Additive Update Predictors in Active Appearance Models", Proc. British Machine Vision Conference 2010

[39] R. H. Davies, C. J. Twining, T. F. Cootes and C. J. Taylor, "Building 3D Statistical Shape Models by Direct Optimisation" IEEE Trans. Medical Imaging (2010)

[40] S. Adeshina and T. F. Cootes, "Constructing Part-based Models for Groupwise Registration", Proc. IEEE Int. Symp. on Biomedical Imaging (ISBI) 2010.

[41] T. Williams, G. Vincent, T. F. Cootes, S. Balamoody, C. Hutchinson, J. Waterton, C. Taylor, "Automatic segmentation of bones and inter-image anatomical correspondence by volumetric statistical modelling of knee MRI", Proc. IEEE Int. Symp. on Biomedical Imaging (ISBI) 2010.

[42] A. Caunce, D. Cristinacce, T. F. Cootes and C. J. Taylor, "Locating Facial Features and Pose Estimation Using a 3D Shape Model", 5th International Symposium on Visual Computing, 2009 pp. 750-761

[43] P. Tresadern, H. Bhaskar, S. Adeshina, C. Taylor and T. F. Cootes "Combining Local and Global Shape Models for Deformable Object Matching", Proc. BMVC 2009 (PDF)

[44] T. F. Cootes, C. J. Twining, K. O. Babalola and C. J. Taylor, "Diffeomorphic Statistical Shape Models", Image and Vision Computing, Vol. 26, pp. 326-332

[45] D. Cristinacce and T. F. Cootes, "Automatic Feature Localisation with Constrained Local Models", Pattern Recognition Vol. 41, No. 10, pp. 3054-3067

[46] M. G. Roberts, T. F. Cootes and J. E. Adams, "Robust Active Appearance Models with Iteratively Rescaled Kernels", Proc. British Machine Vision Conference, Vol. 1, 2007, pp. 302-311.

[47] D. Cristinacce and T. F. Cootes, "Boosted Regression Active Shape Models", Proc. British Machine Vision Conference, Vol. 2, 2007, pp. 880-889.

[48] V. S. Petrovic, T. F. Cootes, A. M. Mills, C. J. Twining and C. J. Taylor, "Automated Analysis of Deformable Structure in Groups of Images", Proc. British Machine Vision Conference, Vol. 2, 2007, pp. 1060-1069.

[49] R. Larsen, M. B. Stegmann, S. Darkner, S. Forchhammer, T. F. Cootes and Kjaer, "Texture enhanced appearance models", Computer Vision and Image Understanding, Vol. 106(1), 2007, pp. 20-30

[50] Babalola K O, Cootes T F, Patenaude B, Rao A, Jenkinson M. "Comparing the similarity of statistical shape models using the Bhattacharya metric" Proc. MICCAI 2006 (Vol. 1), pp 142-50

[51] T. F. Cootes and C. J. Taylor, "An Algorithm for Tuning an Active Appearance Model to New Data", Proc. British Machine Vision Conference, Vol. 3, pp. 919-928, 2006 (PDF)

[52] D. Cristinacce and T. F. Cootes, "Feature Detection and Tracking with Constrained Local Models", Proc. British Machine Vision Conference, Vol. 3, pp. 929-938, 2006

[53] P. Kittipanya-ngam and T. F. Cootes, "The effect of texture representations on AAM performance", Proc. International Conference on Pattern Recognition, Vol. 2, pp. 328-331, 2006

[54] K. O. Babalola and T. F. Cootes, "Groupwise registration of richly labelled images.", Proc. Medical Image Understanding and Analysis, 2006. Vol. 2, pp. 226-230.

[55] D. Cristinacce and T. F. Cootes, "Facial Feature Detection and Tracking with Automatic Template Selection", Proc. 7th IEEE International Conference on Automatic Face and Gesture Recognition 2006, pp. 429-434.

[56] T. F. Cootes, C. J. Twining, V. Petrovic, R. Schestowitz and C. J. Taylor, "Groupwise Construction of Appearance Models using Piece-wise Affine Deformations", Proc. British Machine Vision Conference, 2005, Vol. 2, pp. 879-888.

[57] T. F. Cootes and C. J. Taylor, "Anatomical statistical models and their role in feature extraction", British Journal of Radiology, 2004, Vol. 77, pp S133-S139.

[58] T. F. Cootes, C. J. Twining and C. J. Taylor, "Diffeomorphic Statistical Shape Models", Proc. British Machine Vision Conference 2004, Vol. 1, pp. 447-456, (PDF)

[59] D. Cristinacce, T. F. Cootes and I. Scott, "A Multistage Approach to Facial Feature Detection" Proc. British Machine Vision Conference 2004, Vol. 1, pp. 277-286, (PDF)

[60] T. F. Cootes, S. Marsland, C. J. Twining, K. Smith and C. J. Taylor, "Groupwise Diffeomorphic Non-rigid Registration for Automatic Model Building", Proc ECCV2004, pp. 316-327

[61] D. Cristinacce and T. F. Cootes, "A comparison of shape constrained facial feature detectors", Proc. Int. Conf on Face and Gesture Recognition, 2004, pp. 375-380. (PDF)

[62] F. Bettinger and T. F. Cootes, "A Model of Facial Behaviour", Proc. Int. Conf on Face and Gesture Recognition, 2004, pp. 123-128. (PDF)

[63] R. H. Davies, C. J. Twining, P. D. Allen, T. F. Cootes and C. J. Taylor, "Building optimal 2D Statistical Shape Models", Image and Vision Computing, Vol. 21, pp. 117-82, 2003

[64] D. Cristinacce and T. F. Cootes, "Facial Feature Detection using ADABOOST with Shape Constraints", Proc. BMVC2003, Vol. 1, pp. 231-240.

[65] I. M. Scott, T. F. Cootes, C. J. Taylor, "Improving Appearance Model Matching Using Local Image Structure", Proc. Information Processing in Medical Imaging 2003, pp. 258-269.

[66] P. A. Bromiley, N. A. Thacker, M. L. J. Scott, M. Pokric, A. J. Lacey and T. F. Cootes, "Bayesian and Non-Bayesian Probabilistic Models for Medical Image Analysis", Image and Vision Computing, Vol. 21, No. 10, pp. 851-864, 2003.

[67] T. F. Cootes, P. Kittipanya-ngam, "Comparing Variations on the Active Appearance Model Algorithm", Proc.BMVC2002, Vol. 2, pp. 837-846. (Postscript) (PDF)

[68] F. Bettinger, T. F. Cootes and C. J. Taylor, "Modelling Facial Behaviours", Proc.BMVC2002, Vol. 2, pp. 797-806.

[69] H. Kang, T. F. Cootes and C. J. Taylor, "A Comparison of Face Verification Algorithms using Appearance Models", Proc.BMVC2002, Vol. 2, pp. 477-4862 (PDF)

[70] T. F. Cootes, G. V. Wheeler, K. N. Walker and C. J. Taylor, "View-Based Active Appearance Models", Image and Vision Computing, Vol. 20, 2002, pp. 657-664.

[71] N. P. Costen, T. F. Cootes, G. J. Edwards, C. J. Taylor, "Automatic Extraction of the Face Identity-Subspace", Image and Vision Computing Vol. 20, 2002, pp. 319-329.

[72] R. H. Davies, C. J. Twining, T. F. Cootes, J. C. Waterton, C. J. Taylor, "3D Statistical Shape Models Using Direct Optimisation of Description Length", Proc.ECCV2002, Vol. 3, pp. 3-20.

[73] T. F. Cootes, N. A. Thacker and C. J. Taylor, "Automatic Model Selection by Modelling the Distributions of Residuals", Proc.ECCV2002, Vol. 4, pp. 621-635.

[74] K. N. Walker, T. F. Cootes and C. J. Taylor, "Automatically building appearance models from image sequences using salient features", Image and Vision Computing Vol. 20, Issues 5-6, pp. 435-440.

[75] R. H. Davies and C. Twining and T. F. Cootes and C. J. Taylor, "A Minimum Description Length Approach to Statistical Shape Modelling", IEEE Transactions on Medical Imaging Vol. 21, pp. 525-537, 2002

[76] T. F. Cootes and C. J. Taylor, "Statistical models of appearance for medical image analysis and computer vision", Proc. SPIE Medical Imaging 2001

[77] T. F. Cootes and C. J. Taylor. "On Representing Edge Structure for Model Matching", Proc. CVPR 2001, Volume 1, pp. 1114-1119

[78] R. H. Davies, T. F. Cootes, C. Twining and C. J. Taylor, "An Information Theoretic Approach to Statistical Shape Modelling", Proc. British Machine Vision Conference 2001, pp. 3-11

[79] R. H. Davies, T. F. Cootes and C. J. Taylor, "A Minimum Description Length Approach to Statistical Shape Modelling", Proc. Information Processing in Medical Imaging 2001, pp. 50-63

[80] R. H. Davies, T. F. Cootes, J. C. Waterton and C. J. Taylor, "An Efficient Method of Constructing Optimal Statistical Shape Models", Proc MICCAI, pp. 57-65, 2001

[81] T. F. Cootes and C. J. Taylor. "Constrained Active Appearance Models" Proc. ICCV 2001. Vol. I. pp 748-754

[82] T. F. Cootes, G. J. Edwards and C. J. Taylor. "Active Appearance Models", IEEE PAMI, Vol. 23, No. 6, pp. 681-685, 2001

[83] T. F. Cootes, G. V. Wheeler, K. N. Walker and C. J. Taylor "Coupled-View Active Appearance Models", Proc. British Machine Vision Conference 2000, Vol. 1, pp. 52-61

[84] T. F. Cootes and C. J. Taylor, "Combining Elastic and Statistical Models of Appearance Variation", Proc. European Conference on Computer Vision, 2000, Vol. 1, pp. 149-163

[85] T. F. Cootes, K. N. Walker and C. J. Taylor, "View-Based Active Appearance Models", Proc. Int. Conf. on Face and Gesture Recognition, 2000. pp. 227-232

[86] K. N. Walker, T. F. Cootes, and C. J. Taylor, "Automatically Building Appearance Models", Proc. Int. Conf. on Face and Gesture Recognition, 2000. pp. 271-276

[87] T. F. Cootes and C. J. Taylor, "A Mixture Model for Representing Shape Variation", Image and Vision Computing 17, No. 8, 1999, pp 567-574.

[88] T. F. Cootes, G. J. Edwards and C. J. Taylor, "Comparing Active Shape Models with Active Appearance Models", Proc. British Machine Vision Conference (ed T. Pridmore, D. Elliman), Vol. 1, 1999, pp. 173-182

[89] K. N. Walker and T. F. Cootes and C. J. Taylor, "Automatically Building Appearance Models from Image Sequences using Salient Features", Proc. British Machine Vision Conference (ed T. Pridmore, D. Elliman), Vol. 2, 1999 pp. 463-562

[90] G. J. Edwards and T. F. Cootes and C. J. Taylor, "Advances in Active Appearance Models". Proc International Conference on Computer Vision, pp 137-142, 1999.

[91] G. J. Edwards, C. J. Taylor, T. F. Cootes, "Interpreting Face Images using Active Appearance Models", Int. Conf. on Face and Gesture Recognition 1998. pp. 300-305

[92] G. J. Edwards, C. J. Taylor, T. F. Cootes, "Learning to Identify and Track Faces in Image Sequences", Int. Conf. on Face and Gesture Recognition 1998. pp 260-265

[93] T. F. Cootes, G. J. Edwards and C. J. Taylor. "Active Appearance Models", in Proc. European Conference on Computer Vision 1998 (H. Burkhardt & B. Neumann Ed.s). Vol. 2, pp. 484-498, Springer, 1998.

[94] G. J. Edwards, T. F. Cootes and C. J. Taylor, "Face Recognition Using Active Appearance Models", in Proc. European Conference on Computer Vision 1998 (H. Burkhardt & B. Neumann Ed.s). Vol. 2, pp. 581-695, Springer, 1998

[95] K. N. Walker, T. F. Cootes and C. J. Taylor. "Locating Salient Object Features", in Proc. British Machine Vision Conference, 1998, (Eds: P. H. Lewis and M. S. Nixon) Vol. 2, pp. 557-566, BMVA Press, 1998.

[96] T. F. Cootes, G. J. Edwards and C. J. Taylor. "A Comparative Evaluation of Active Appearance Model Algorithms", in Proc. British Machine Vision Conference, 1998, (Eds: P. H. Lewis and M. S. Nixon) Vol. 2, pp. 680-689, BMVA Press, 1998.

[97] P. D. Sozou, T. F. Cootes, C. J. Taylor and E. C. Di Mauro, "Non-linear Point Distribution Modelling using a Multi-layer perceptron", Image and Vision Computing Vol. 15, No. 6, pp. 457-463, 1997.

[98] T. Ahmad, C. J. Taylor, A. Lanitis, T. F. Cootes. "Tracking and Recognising Hand Gestures using Statistical Shape Models." Image and Vision Computing, Vol. 15, No. 5, pp. 345-352, 1997.

[99] C. J. Taylor, T. F. Cootes, A. Lanitis, G. Edwards, P. Smyth and A. C. W. Kotcheff. "Model-Based Interpretation of Complex and Variable Images." Phil. Trans. R. Soc. Lond. B (1997) 352,1267-74.

[100] A. Lanitis, C. J. Taylor, T. F. Cootes, "Automatic Interpretation and Coding of Face Images Using Flexible Models. IEEE PAMI Vol. 19 No. 7 pp. 743-756, July 1997.

[101] T. F. Cootes, C. J. Taylor. A Mixture Model for Representing Shape Variation. Proc 8th BMVC (Vol. 1) (Ed. A. F. Clark) BMVA Press, pp. 110-119. 1997.

[102] G. J. Edwards, C. J. Taylor and T. F. Cootes. Learning to Identify and Track Faces in Image Sequences. Proc 8th BMVC (Vol. 1) (Ed. A. F. Clark) BMVA Press, pp. 130-139. 1997.

[103] K. N. Walker, T. F. Cootes and C. J. Taylor. Correspondence Using Distinct Points Based on Image Invariants. Proc 8th BMVC (Vol. 1) (Ed. A. F. Clark) BMVA Press, pp. 540-549. 1997.

[104] T. F. Cootes, E. Di Mauro, C. J. Taylor, Flexible 3D Models from Uncalibrated Cameras. Image and Vision Computing. 14 (8) August 1996, pp. 581-587.

[105] T. F. Cootes, G. J. Page, C. B. Jackson, C. J. Taylor, "Statistical Grey-Level Models for Object Location and Identification." Image and Vision Computing 14 (8) August 1996, pp. 533-540.

[106] A. Hill, T. F. Cootes, C. J. Taylor. "Active Shape Models and the shape approximation problem." Image and Vision Computing. 14 (8) August 1996 pp 601-608.

[107] T. F. Cootes, C. J. Taylor. Locating Objects of Varying Shape using Statistical Feature Detectors. Proc. European Conference on Computer Vision (B. Buxton Ed.). pp. 465-474, Springer-Verlag, 1996.

[108] T. F. Cootes, C. J. Taylor. Data Driven Refinement of Active Shape Model Search. in Proc. British Machine Vision Conference. (Ed. R. B. Fisher and E. Trucco), BMVA Press, 1996, pp. 383-392

[109] E. C. Di Mauro, T. F. Cootes, C. J. Taylor, A. Lanitis. Active Shape Model Search using pairwise Geometric Histograms. in Proc. British Machine Vision Conference. (Ed. R. B. Fisher and E. Trucco), BMVA Press, 1996, pp. 353-362.

[110] G. J. Edwards, A. Lanitis, C. J. Taylor, T. F. Cootes. Statistical Models of Face Images. in Proc. British Machine Vision Conference. (Ed. R. B. Fisher and E. Trucco), BMVA Press, 1996, pp. 765-774.

[111] A. Lanitis, P. D. Sozou, C. J. Taylor, T. F. Cootes, and E. C Di Mauro, "A General Non-Linear Method For Modelling Shape And Locating Image Objects", Procs. of the International Conference of Pattern Recognition, Vol 4, pp 266-270, IEEE Computer Society Press, Vienna, Austria, 1996.

[112] T. F. Cootes, C. J. Taylor. Locating Faces Using Statistical Feature Detectors. Proc 2nd Int. Conf. on Automatic Face and Gesture Recognition, IEEE Comp. Soc. Press, Los Alamitos, Calif., 1996. pp. 204-209.

[113] G. J. Edwards, A. Lanitis, C. J. Taylor, T. F. Cootes. Modelling the Variability in Face Images. Proc 2nd Int. Conf. on Automatic Face and Gesture Recognition, IEEE Comp. Soc. Press, Los Alamitos, Calif., 1996. pp. 328-333.

[114] T. F. Cootes, D. Cooper, C. J. Taylor and J. Graham, "Active Shape Models—Their Training and Application." Computer Vision and Image Understanding. Vol. 61, No. 1, January 1995, pp. 38-59.

[115] A. Lanitis, C. J. Taylor, T. F. Cootes, "An automatic face identification system using flexible appearance models." Image and Vision Computing Vol. 13 No. 5 Jun. 1995. pp. 393-402.

[116] T. F. Cootes, C. J. Taylor, "Combining point distribution models with shape models based on finite element analysis." Image and Vision Computing Vol. 13, No. 5 Jun. 1995. pp. 403-409.

[117] A. Lanitis, C. J. Taylor, T. F. Cootes, A. Ahmad, Automatic Interpretation of Human Faces and Hand Gestures using Flexible Models. Proc. International Workshop on Automatic Face and Gesture Recognition, Zurich, Switzerland, (Ed. M. Bichsel), 1995, pp. 98-103.

[118] A. Lanitis, A. Hill, T. F. Cootes, C. J. Taylor. Locating Facial Features using Genetic Algorithms. Proc. International Conference on Digital Signal Processing, Cyprus, 1995. pp. 520-525.

[119] A. Lanitis, C. J. Taylor, T. F. Cootes. A Unified Approach to Coding and Interpretting Faces. Proc. 5th International Conference on Computer Vision. 1995. pp. 368-373.

[120] P. D. Sozou, T. F. Cootes, C. J. Taylor and E. C. Di Mauro, "A non-linear Generalisation of Point Distribution Models using Polynomial Regression", "Image and Vision Computing Journal, Vol. 13, No. 5, June 1995, pp. 451-457.

[121] T. F. Cootes, G. J. Page, C. B. Jackson, C. J. Taylor, Statistical Grey-Level Models for Object Location and Identification. in Proc. British Machine Vision Conference. (Ed. D. Pycock), BMVA Press, 1995, pp. 533-542. (pdf)

[122] T. F. Cootes, E. Di Mauro, C. J. Taylor, Flexible 3D Models from Uncalibrated Cameras in Proc. British Machine Vision Conference. (Ed. D. Pycock), BMVA Press, 1995, pp. 147-156.

[123] P. D. Sozou, T. F. Cootes, C. J. Taylor and E. C. Di Mauro. Non-Linear Point Distribution Modelling Using a Multi-Layer Perceptron. in Proc. British Machine Vision Conference. (Ed. D. Pycock), BMVA Press, 1995, pp. 107-116

[124] A. Hill, T. F. Cootes and C. J. Taylor. Active Shape Models and the Shape Approximation Problem. in Proc. British Machine Vision Conference. (Ed. D. Pycock), BMVA Press, 1995, pp. 157-166.

[125] T. Ahmad, C. J. Taylor, A. Lanitis, T. F. Cootes. Tracking and Recognising Hand Gestures using Statistical Shape Models. in Proc. British Machine Vision Conference. (Ed. D. Pycock), BMVA Press, 1995, pp. 403-412.

[126] T. F. Cootes, A. Hill, C. J. Taylor, Medical Image Interpretation Using Active Shape Models: Recent Advances. 14th International Conference on Information Processing in Medical Imaging, 1995, pp. 371-372.

[127] T. F. Cootes, D. Cooper, C. J. Taylor and J. Graham, Image search using trained flexible shape models, Advances in Applied Statistics: Statistics and Images: 2. Ed. K. V. Mardia, Carfax Publishing Company, 1994, pp. 111-139.

[128] T. F. Cootes, C. J. Taylor, Combining point distribution models with shape models based on finite element analysis. in Proc. British Machine Vision Conference, 1994, pp. 419-428.

[129] T. F. Cootes, C. J. Taylor, Modelling object appearance using the grey-level surface. in Proc. British Machine Vision Conference, 1994, pp. 479-488.

[130] T. F. Cootes, C. J. Taylor, A. Lanitis, Active Shape Models: Evaluation of a Multi-Resolution Method for Improving Image Search, in Proc. British Machine Vision Conference, 1994, pp. 327-336.

[131] J. Haslam, C. J. Taylor, T. F. Cootes, A Probabalistic Fitness Measure for Deformable Template Models, in Proc. British Machine Vision Conference., BMVA Press, 1994, pp. 33-42.

[132] A. Lanitis, C. J. Taylor, T. F. Cootes, An automatic face identification system using flexible appearance models. in Proc. British Machine Vision Conference., BMVA Press, 1994, pp. 66-75.

[133] P. D. Sozou, T. F. Cootes, C. J. Taylor, A non-linear generalisation of point distribution models using polynomial regression. in Proc. British Machine Vision Conference, BMVA Press, 1994, pp. 397-406.

[134] T. F. Cootes, C. J. Taylor, A. Lanitis, Using Grey-Level Models to Improve Active Shape Model Search, Proc. International Conference on Pattern Recognition Vol. I, Jerusalem, October 1994. pp. 63-67.

[135] T. F. Cootes, C. J. Taylor, A. Lanitis, Multi-Resolution Search with Active Shape Models, Proc. International Conference on Pattern Recognition Vol I., Jerusalem, October 1994. pp 610-612.

[136] A. Lanitis, C. J. Taylor, T. F. Cootes, Automatic Tracking, Coding and Reconstruction of Human Faces using Flexible Appearance Models, IEE Electronic Letters 30, pp. 1578-1579. 1994

[137] T. F. Cootes, C. J. Taylor, A. Lanitis, D. H. Cooper and J. Graham, Building and Using Flexible Models Incorporating Grey-Level Information. Proc. Fourth International Conference on Computer Vision, IEEE Computer Society Press, 1993, pp. 242-246.

[138] T. F. Cootes, C. J. Taylor, A. Hill and J. Haslam, The Use of Active Shape Models For Locating Structures. Proc. 13th International Conference on Information Processing in Medical Imaging, (Eds. H. H. Barrett, A. F. Gmitro) Springer-Verlag, 1993, pp. 33-47.

[139] T. F. Cootes, C. J. Taylor, Active Shape Model Search using Local Grey-Level Models: A Quantitative Evaluation, in Proc. British Machine Vision Conference, (Ed. J. Illingworth), BMVA Press, 1993, pp. 639-648.

[140] A. Ratter, O. Baujard, C. J. Taylor and T. F. Cootes, A Distributed Approach to Image Interpretation Using Model-Based Spatial Reasoning. in Proc. British Machine Vision Conference., BMVA Press, 1993, pp. 319-328.

[141] Hiroki Watanabe, et al., "Detection and Estimation of Omni-Directional Pointing Gestures using Multiple Cameras", MVA2000 IAPR Workshop on Machine Vision Applications. Nov. 28-30, 2000, The University of Tokyo, Japan.

[142] B. Stenger, et al., "Model-Based Hand Tracking Using an Unscented Kalman Filter", Proc. British Machine Vision Conference, volume I, pp. 63-72 (2001).

[143] J. Richarz, et al., "A Monocular Pointing Pose Estimator for Gestural Instruction of a Mobile Robot", International Journal of Advanced Robotic Systems, Vol. 4, No. 1 pp. 139-150 (2007).

[144] E. Littmann, et al., "Robot guidance by Human Pointing Gestures", (1996) CiteseerX 10.1.1.45.3514.

[145] Kai Nickel, et al., "Recognition of 3D-Pointing Gestures for Human-Robot-Interaction", Proceedings of Humanoids 2003, Karlsruhe, Germany (2003).

[146] Hossein Mobahi et al., "Fast Initialization of Active Contours—Towards Practical Visual Interfaces for Human-Robot Interaction", IEEE Proc. Intelligent Robots and Systems, 2004. (IROS 2004).

[147] Chang-Beom Park et al., "Real-Time 3D Pointing Gesture Recognition in Mobile Space", IEEE $8^{th}$ International Conference on Automatic Face & Gesture Recognition, 2008. FG (2008).

[148] Maria João M. Vasconcelos et al., "Automatic Modelling Image Represented Objects Using A Statistic Based Approach", in The European Simulation and Modelling Conference (ESM), Porto, Portugal, pp. 7-12, 2005.

[149] João Manuel R. S. Tavares, et al., "Computer Analysis Of Objects' Movement In Image Sequences: Methods And Applications", Artigo em Revista Científica Internacional, hdl.handle.net/10216/21527, call no. 25189, repositorio-aberto.up.pt/handle/10216/21527, (2009).

[150] Tavares, João Manuel R. S.; Carvalho, Fernando; Oliveira, Francisco; Reis, Ilda; Vasconcelos, Maria João M.; Gonçalves, Patrícia; Pinho, Raquel; Ma, Zhen (2009)—Computer analysis of objects' movement in image sequences: methods and applications. International Journal for Computational Vision and Biomechanics. ISSN 0973-6778. 1:2, p. 209-220.

[151] Maria João M. Vasconcelos, et al., "Methods to Automatically Build Point Distribution Models for Objects like Hand Palms and Faces Represented in Images", (2008) repositorio-aberto.up.pt/bitstream/10216/6858/2/16567.pdf

[152] Reinhard Beichel, et al., "Robust Active Appearance Model Matching", In Bildverarbeitung für die Medizin 2005. Springer.

[153] Jie Ma, et al., "Global Structure Constraint: A Fast Pre-location for Active Appearance Model", Advances in Intelligent and Soft Computing, 2009, Volume 116/2009, 433-441, DOI: 10.1007/978-3-642-03156-4_44.

[154] Masaaki Fukumoto, et al., "'Finger-Pointer': Pointing Interface By Image Processing", Comput. & Graphics. Vol. I8. No. 5. pp. 633-642 (1994) Elsevier Science Ltd.

[155] Sébastien Carbini, et al., "Pointing Gesture Visual Recognition for Large Display", Pointing'04 ICPR Workshop, Cambridge, United Kingdom, 22 Aug. 2004.

[156] S. Carbini, J. E. Viallet, O. Bernier, "Pointing Gesture Visual Recognition by Body Feature Detection and Tracking", ICCVG (International Conference on Computer Vision and Graphics 2004), Warszawa, Poland, 22-24 Sep. 2004.

[157] S. Carbini, J. E. Viallet, O. Bernier, "Simultaneous Body Parts Statistical Tracking for Bi-Manual Interactions", ORASIS, Fournol, France, 24-27 May 2005.

[158] S. Carbini, J. E. Viallet, L. Delphin-Poulat, "MOWGLI: Multimodal Oral With Gesture Large display Interface", GW (Gesture Workshop), Berder Island, France, 18-20 May 2005.

[159] S. Carbini, L. Delphin-Poulat, L. Perron, J. E. Viallet, "From a Wizard of Oz Experiment to a Real Time Speech and Gesture Multimodal Interface", (prospective submission) Special issue of Signal Processing (ELSEVIER) on Multimodal Human Computer Interfaces, January 2006.

[160] Yoichi Sato, et al., "Real-Time Input of 3D Pose and Gestures of a User's Hand and Its Applications for HCI", IEEE Proc. Virtual Reality, 2001. Pages: 79-86 (2001).

[161] Cornelius Malerczyk, "Interactive Museum Exhibit Using Pointing Gesture Recognition", WSCG'2004, Feb. 2-6, 2004, Plzen, Czech Republic.

[162] Roland Kehl, et al., "Real-Time Pointing Gesture Recognition for an Immersive Environment", Sixth IEEE International Conference on Automatic Face and Gesture Recognition (FG'04) pp. 577 (2004).

[163] Thomas B. Moeslund, et al., "A Natural Interface to a Virtual Environment through Computer Vision-estimated Pointing Gestures", GW '01 Revised Papers from the International Gesture Workshop on Gesture and Sign Languages in Human-Computer Interaction, Pages 59-63 (2001).

[164] Kai Nickel, et al., "Real-time Recognition of 3D-Pointing Gestures for Human-Machine-Interaction", in Proc. DAGM-Symposium, 2003, pp. 557-565.

[165] P. Serafinavičius, "Estimating Characteristic Points of Human Body for Automatic Hand Pointing Gesture Recognition", Electronics And Electrical Engineering Medicine Technology ISSN 1392-1215 No. 8(80) T 115 (2007).

[166] Vladimir I. Pavlovic, "Visual Interpretation of Hand Gestures for Human-Computer Interaction: A Review", IEEE Transactions On Pattern Analysis And Machine Intelligence, Vol. 19, No. 7, 677-695, (1997).

[167] Yasuo Ariki, et al., "Recognition of Handsfree Speech and Hand Pointing Action for Conversational TV", ACM MM'05, Nov. 6-11, 2005, Singapore.

[168] Kai Nickel, et al., "Real-time Person Tracking and Pointing Gesture Recognition for Human-Robot Interaction", CVHCI04(28-38) Lecture Notes in Computer Science, Volume 3058, 2004, DOI: 10.1007/b97917, Computer Vision in Human-Computer Interaction, ECCV 2004 Workshop on HCI, Prague, Czech Republic, May 16, 2004. Proceedings, Nicu Sebe, Michael Lew and Thomas S. Huang Eds. (2004).

[169] B. Stenger, et al., "Model-Based 3D Tracking of an Articulated Hand", Proc. IEEE Conf. Computer Vision and Pattern Recognition, CVPR 2001, Vol. 2, Page(s): II-310-II-315 (2001).

[170] Nickel, K., et al., "3D-tracking of head and hands for pointing gesture recognition in a human-robot interaction scenario", IEEE AFGR04(565-570) (2004).

[171] K. Nickel, et al., "Visual recognition of pointing gestures for human-robot interaction", Image Vis. Comput. (2006), doi: 10.1016/j.imavis.2005.12.020 (2006).

[172] Shin Sato, et al., "A Human-Robot Interface Using an Interactive Hand Pointer that Projects a Mark in the Real Work Space", Proc. IEEE International Conf. on Robotics and Automation, 2000. Proceedings. ICRA '00. Volume: 1, pp. 589-595 (2000).

[173] Nebojsa Jojic, "Detection and Estimation of Pointing Gestures in Dense Disparity Maps", International Conference on Automatic Face and Gesture Recognition, France (2000).

[174] Ali Erol, et al., "Vision-based hand pose estimation: A review", Computer Vision and Image Understanding 108: 52-73 (2007).

[175] Kai Nickel, et al., "Pointing Gesture Recognition based on 3D Tracking of Face, Hands and Head Orientation", ICMI'03, Nov. 5-7, 2003, Vancouver, British Columbia, Canada (2003).

[176] B. Stenger, et al., "Hand Pose Estimation Using Hierarchical Detection", Intl. Workshop on Human-Computer Interaction, pp. 102-112 (2004).

[177] Carlo Colombo, et al., "Visual Capture and Understanding of Hand Pointing Actions in a 3-D Environment", IEEE Transactions On Systems, Man, And Cybernetics—Part B: Cybernetics, Vol. 33, No. 4, August 2003 pp. 677-686 (2003).

[178] Jakub Segen, et al., "Shadow Gestures: 3D Hand Pose Estimation using a Single Camera", IEEE Conf. Computer Vision and Pattern Recognition, 1999. Vol. 1 (1999).

[179] Philippe Vindras, et al., "Pointing Errors Reflect Biases in the Perception of the Initial Hand Position", AJP—JN Physiol June 1998 Vol. 79 no. 6 3290-3294 (1998)

[180] Kerdvibulvech, C. et al., "Model-Based Hand Tracking by Chamfer Distance and Adaptive Color Learning Using Particle Filter", JIVP, No. 2009:724947 (2009).

[181] Park, C. B., et al., "Real-time 3D pointing gesture recognition for mobile robots with cascade HMM and particle filter", IVC(29), No. 1, January 2011, pp. 51-63.

[182] Gallo, O., et al., "Camera-based pointing interface for mobile devices", ICIP08(1420-1423). (2008)

[183] Barrho, J., et al., "Finger Localization and Classification in Images based on Generalized Hough Transform and Probabilistic Models", ICARCV06(1-6) (2006).

[183] Argyros, A. A., et al., "Binocular Hand Tracking and Reconstruction Based on 2D Shape Matching", ICPR06(I: 207-210) (2006).

[184] Argyros, A. A., et al., "Vision-Based Interpretation of Hand Gestures for Remote Control of a Computer Mouse", CVHCI06(40-51) (2006).

[185] Hossain, M., et al., "Recognizing Hand-Raising Gestures using HMM", CRV05(405-412) (2005).

[186] Hosoya, E., et al, "Arm-Pointer: 3D Pointing Interface for Real-World Interaction", CVHCI04(72-82) (2004).

[187] Chandran, S., et al., "Real-Time Detection and Understanding of Isolated Protruded Fingers", RealTimeHCI04(152) (2004).

[188] Kehl, R., et al., "Real-time pointing gesture recognition for an immersive environment", AFGR04(577-582) (2004).

[189] Yamamoto, Y., et al., "Arm-pointing gesture interface using surrounded stereo cameras system", ICPR04(IV: 965-970) (2004).

[190] Hild, M., et al., "Object recognition via recognition of finger pointing actions", CIAP03(88-93) (2003).

[191] Lee, M. S., et al., "A Computer Vision System for On-Screen Item Selection by Finger Pointing", CVPR01(I: 1026-1033) (2001).

[192] Jojic, N., et al., "Detection and estimation of pointing gestures in real-time stereo sequences", AFGR00(468-475) (2000).

[193] Wu, A., et al., "A Virtual 3D Blackboard: 3D Finger Tracking using a Single Camera", AFGR00(536-543) (2000).

[194] Gherbi, R., et al., "Interpretation of Pointing Gesture: The PoG System", GW99(153) (1999).

[195] Bretzner, L., et al., "Use Your Hand as a 3-D Mouse or Relative Orientation from Extended Sequences of Sparse Point and Line Correspondences Using the Affine Trifocal Tensor", ECCV98(I: 141) (1998).

[196] Hung, Y. P., et al., "Free-Hand Pointer by Use of an Active Stereo Vision System", ICPR98(Vol II: 1244-1246) (1998).

[197] Sifang, L., et al., "A real-time monocular vision-based 3D mouse system", CAIP97(448-455) (1997).

[198] iris.usc.edu/vision-notes/bibliography/people926.html (08-02-2012)

What is claimed is:

1. A method for determining a finger pointing target, comprising:
   receiving a plurality of images comprising a sequence of images over time, including images acquired from different perspectives representing a hand having a finger with a finger pointing direction;
   tracking a plurality of landmarks on the hand comprising at least two visible landmarks of the finger having the finger pointing direction, a center of the hand, and a position of a wrist proximate to the hand, in a series of images, the respective landmarks being derived from common characteristics of hands from a plurality of different people;
   determining a best fit for visible landmarks of the hand in each of the series of images to an active appearance model;
   inferring a three dimensional position of each visible landmark in the series of images;
   determining the finger pointing directional vector of the finger based on the inferred three dimensional position of each visible landmark in the series of images; and
   determining a finger pointing gesture based on at least a change in the determined directional vector over time.

2. The method according to claim 1, further comprising detecting the hand by generating Haar-like features from at least two images, and implementing a cascade detector using AdaBoost, wherein portions of each respective image of the sequence of images over time are scanned over different translations, scales and rotations to find a best fit for the hand.

3. The method according to claim 1, wherein color sensitive image processing is employed to distinguish the hand from a background in the series of images and to define a wrist location as a location adjacent to the hand having a most similar surrounding color consistent with skin tones.

4. The method according to claim 1, further comprising determining a finger pointing target along the finger pointing directional vector.

5. The method according to claim 1, wherein the finger pointing directional vector is a three dimensional vector, and the at least two visible landmarks of the finger are selected based on a reliability of a resulting three dimensional pointing vector.

6. The method according to claim 1, further comprising providing a user feedback display of a determined finger pointing directional vector.

7. The method according to claim 1, wherein the finger pointing gesture is determined by at least a statistical correspondence to a model of the change of the determined finger pointing direction vector over time.

8. The method according to claim 1, wherein a best fit for visible landmarks of the hand in each of the plurality of images to the active appearance model is updated for each respective image of the sequence of images over time, to track a movement of the hand over time.

9. The method according to claim 1, wherein the sequence of images over time comprises video signals in which the hand appears acquired from different positions.

10. A method for determining a hand gesture, comprising:
    capturing a plurality of images of a hand from different perspectives;
    determining a center of the hand and a position of a wrist associated with the hand in each image;
    finding a best fit for the hand in each image to an active appearance model;
    inferring a three dimensional position of a plurality of landmarks on the hand, corresponding to landmarks of human hands in a training image set to which a principal component analysis is applied to formulate a statistical model of the human hand;
    combining the fit of the hand to the active appearance model in each image, with the inferred three dimensional position of a plurality of landmarks on the hand, to automatically determine at least one directional vector defined by the plurality of landmarks;
    and determining a gesture based on a change in the at least one directional vector over time.

11. The method according to claim 10, wherein the at least two landmarks are selected based on an estimated reliability of the resulting directional vector.

12. The method according to claim 10, wherein the hand is detected in the plurality of images by at least generating Haar-like features from the a plurality of images, and implementing a cascade detector using AdaBoost, wherein portions of each image are scanned over different translations, scales and rotations to find a best fit for the hand.

13. The method according to claim 10, wherein the a plurality of images are color images, and wherein color sensitive image processing is employed to distinguish the hand from a background, and color sensitive image processing is employed to define a wrist location as a location on the hand having a most similar surrounding color consistent with skin tones.

14. The method according to claim 10, further comprising providing feedback to a user of the at least one directional vector.

15. The method according to claim 10, wherein the determined at least one directional vector represents a statistical averaging over time.

16. The method according to claim 10, wherein the best fit for the hand in each image to the active appearance model is updated for respective sequences of the plurality of images, to track a movement of the hand.

17. The method according to claim 10, wherein the plurality of images are acquired from at least two different perspectives by at least two different video cameras.

18. An apparatus for estimating a finger pointing direction, comprising:
- a memory configured to store an appearance hand model which tracks a plurality of landmarks on the hand, derived from characteristics of a plurality of different hands;
- a memory configured to store a plurality of images acquired from different angles representing a hand in a sequence of images over time;
- at least one automated processor, configured to:
- detect the hand in each of the plurality of images;
- locate a center of the hand and a position of a wrist proximate to the hand in each of the plurality of images;
- apply the active appearance model to find a best fit for visible landmarks of the hand in each of the plurality of images;
- combine the best fit for the visible landmarks of the hand in each of the plurality of images to the active appearance model, to infer a three dimensional position of each visible landmark in each of the plurality of images;
- determine a sequence of directional vector over time associated with the inferred three dimensional position of each visible landmark; and
- determine a gesture based on at least a change in the determined sequence of directional vector over time.

19. The apparatus according to claim 18, wherein the plurality of landmarks comprise at least two landmarks of a pointing finger, and the at least one automated processor is further configured to determine at least one target of the pointing finger based on at least the determined directional vector.

20. The apparatus according to claim 18, wherein the at least one automated processor is further configured to determine the gesture based on a statistical correspondence to a model of the determined change of the sequence of a target of directional vector over time.

* * * * *